(12) United States Patent
Rock

(10) Patent No.: US 9,039,819 B2
(45) Date of Patent: *May 26, 2015

(54) COMPACTED AIR FLOW RAPID FLUID EVAPORATION SYSTEM

(71) Applicant: Kelly P. Rock, Vienna, VA (US)

(72) Inventor: Kelly P. Rock, Vienna, VA (US)

(73) Assignee: Micronic Industries, Inc., Wise, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/624,318

(22) Filed: Sep. 21, 2012

(65) Prior Publication Data

US 2013/0174988 A1      Jul. 11, 2013

Related U.S. Application Data

(63) Continuation of application No. 12/636,527, filed on Dec. 11, 2009, now Pat. No. 8,273,165.

(51) Int. Cl.
| | |
|---|---|
| *B01D 19/00* | (2006.01) |
| *B01D 1/20* | (2006.01) |
| *B01D 1/14* | (2006.01) |
| *B01D 1/30* | (2006.01) |
| *B01D 5/00* | (2006.01) |
| *C02F 1/04* | (2006.01) |

(52) U.S. Cl.
CPC .. *B01D 1/20* (2013.01); *B01D 1/14* (2013.01); *B01D 1/30* (2013.01); *B01D 5/0003* (2013.01); *B01D 5/006* (2013.01); *C02F 1/04* (2013.01)

(58) Field of Classification Search
CPC ............ B01D 1/20; B01D 1/14; B01D 5/006; B01D 5/0003; B01D 1/30; C02F 1/04
USPC ............... 55/345, 343, 346, 347, 459.1, 456; 96/208, 209, 351, 352; 210/180, 221.2, 210/188, 218, 220, 512.1; 203/10–11; 202/173, 176; 239/398

See application file for complete search history.

(56) References Cited

U.S. PATENT DOCUMENTS

| | | |
|---|---|---|
| 3,649,468 A | 3/1972 | Bechard et al. |
| 3,837,491 A | 9/1974 | Humiston et al. |
| 4,176,779 A | 12/1979 | Kirk et al. |
| 4,515,734 A | 5/1985 | Rock et al. |
| 4,568,500 A | 2/1986 | Rock et al. |
| 4,595,459 A | 6/1986 | Kusakawa et al. |

(Continued)

FOREIGN PATENT DOCUMENTS

WO    WO 2007/133771 A2    11/2007

*Primary Examiner* — Dung H Bui

(57) ABSTRACT

A total water desalination system is disclosed that includes a centrifugal separator, a feed-water device controlled by a relative humidity sensor, an air pump, an evaporator core, an air dryer, a non-particulate coalescent air filter, and an air flow/brine gravity separating tank. The evaporator core typically contains multiple conical processing chambers and introduces a physical dynamic that increases the surface area of the water, using low-level thermal energy to vaporize micron-size water particles into a gaseous state, suitable for reconstitution into desalinated (or lower salt content) water. The evaporator core operation principles are based on creating a highly dynamic environment that separates impurities from sea, brackish, river, or turbid water; evaporating the water into a residual clean vapor, and returning the vapor to water composition with high efficiency.

17 Claims, 20 Drawing Sheets

(56) References Cited

U.S. PATENT DOCUMENTS

| | | |
|---|---|---|
| 5,078,880 A | 1/1992 | Barry |
| 5,176,799 A | 1/1993 | Roe et al. |
| 5,472,645 A | 12/1995 | Rock et al. |
| 5,534,118 A | 7/1996 | McCutchen |
| 5,620,561 A | 4/1997 | Kuhn et al. |
| 5,672,187 A | 9/1997 | Rock et al. |
| 5,744,008 A | 4/1998 | Craven |
| 6,110,368 A | 8/2000 | Hopkins et al. |
| 6,113,078 A | 9/2000 | Rock |
| 6,234,459 B1 | 5/2001 | Rock |
| 6,244,573 B1 | 6/2001 | Rock |
| 6,293,121 B1 | 9/2001 | Labrador |
| 6,347,789 B1 | 2/2002 | Rock |
| 6,500,216 B1 | 12/2002 | Takayasu |
| 6,648,306 B2 | 11/2003 | Rock |
| 6,669,176 B2 | 12/2003 | Rock |
| 6,811,690 B2 | 11/2004 | Arnaud |
| 6,973,792 B2 | 12/2005 | Hicks |
| 7,681,569 B2 | 3/2010 | Rock |
| 7,897,019 B2 | 3/2011 | Akers |
| 8,273,165 B2 | 9/2012 | Rock |
| 2007/0204839 A1 | 9/2007 | Rock et al. |
| 2008/0083605 A1 | 4/2008 | Holtzapple et al. |
| 2009/0139192 A1* | 6/2009 | Sams et al. .................. 55/418 |
| 2010/0038229 A1 | 2/2010 | Nadeau, Jr. et al. |
| 2010/0065510 A1 | 3/2010 | Krichtafovitch et al. |
| 2011/0309162 A1 | 12/2011 | Rock |

* cited by examiner

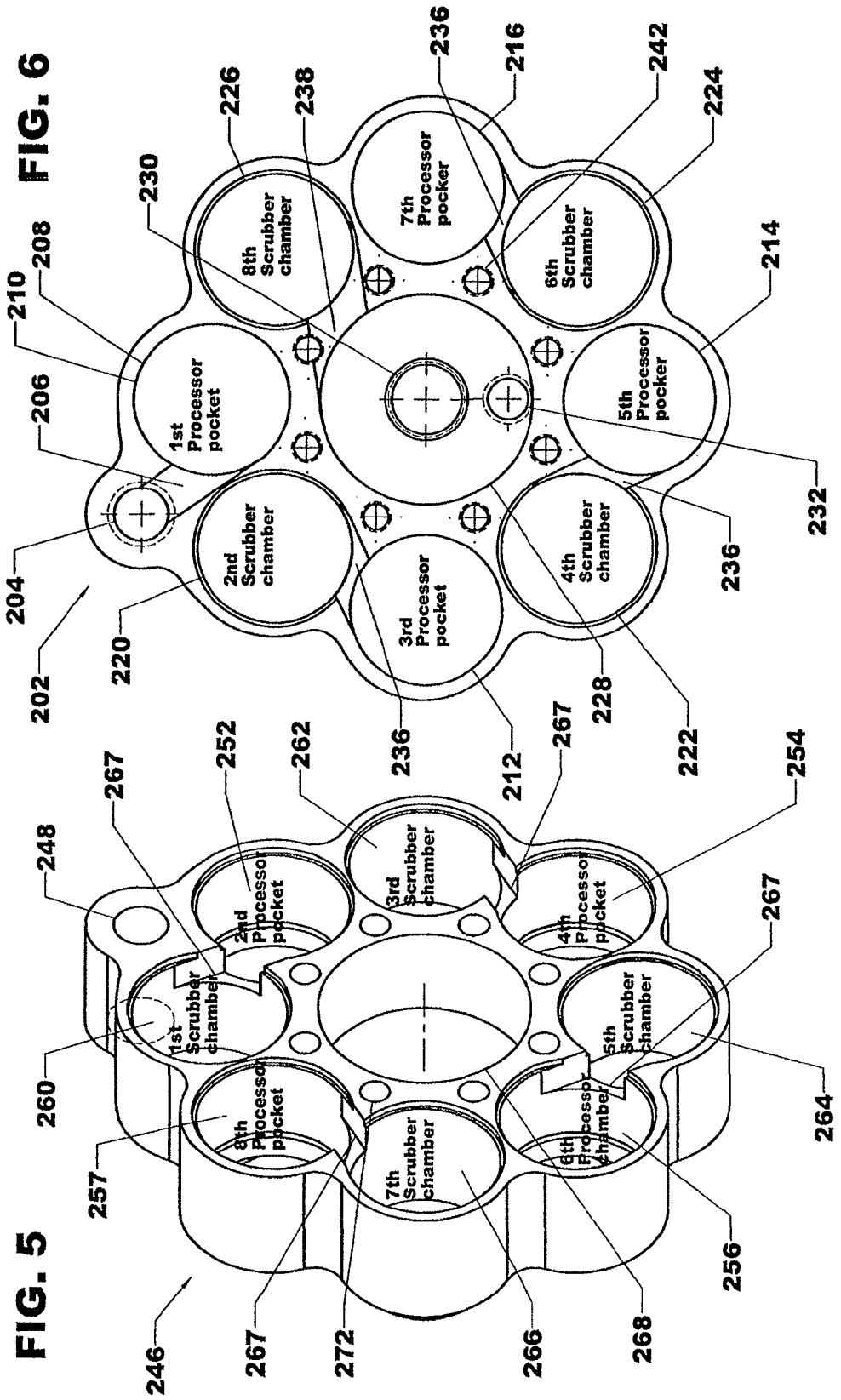

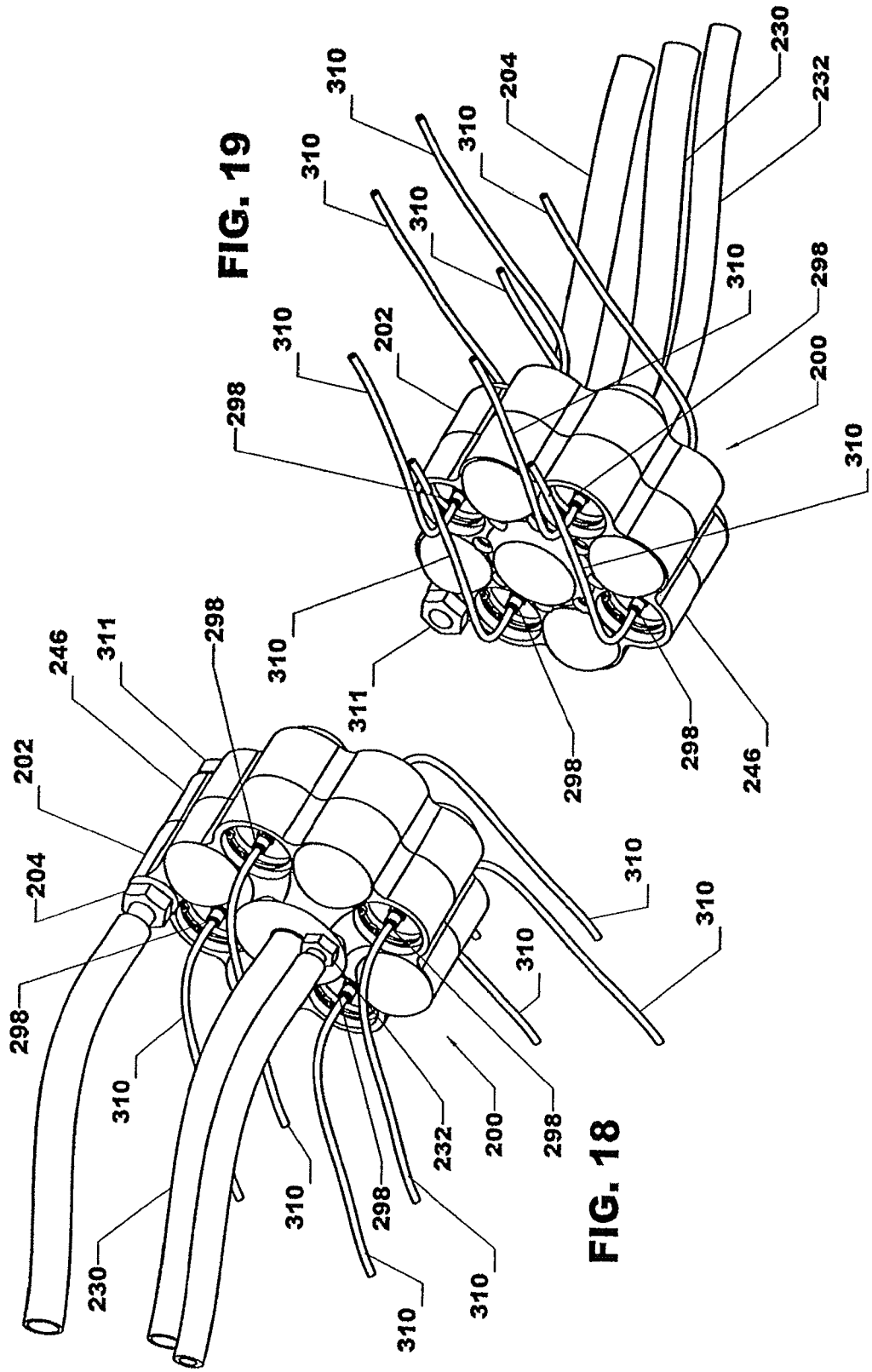

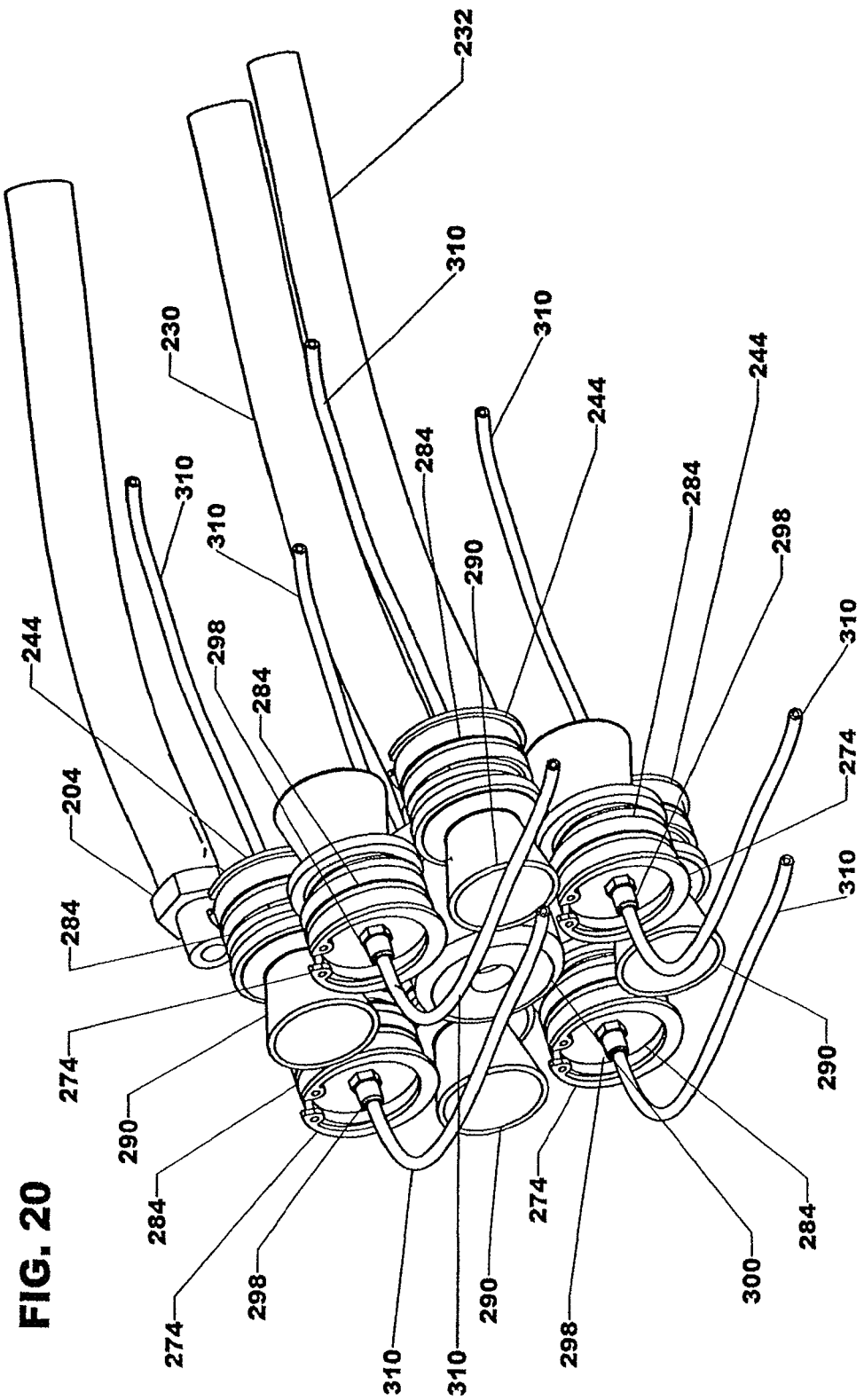

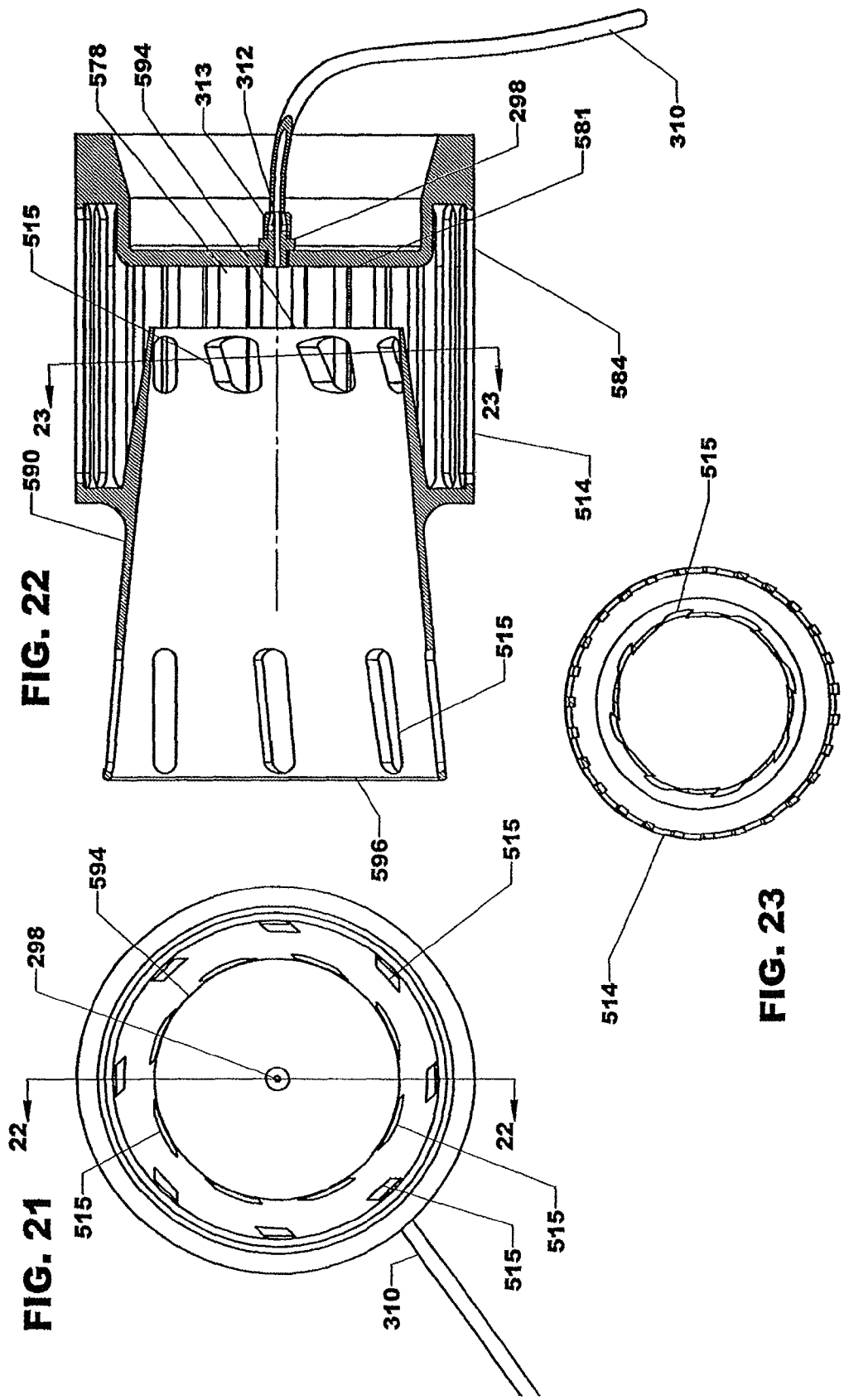

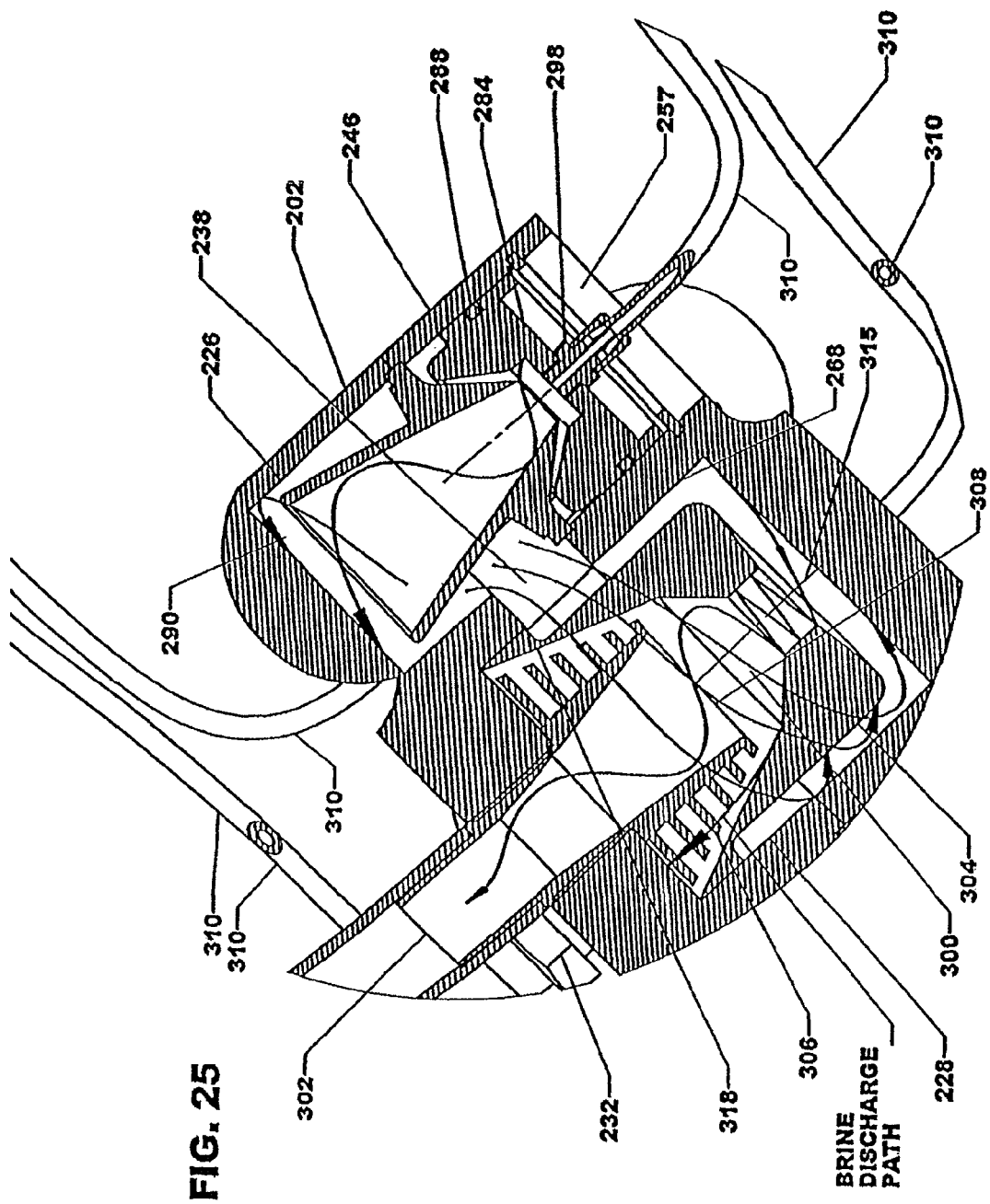

COMPACTED AIR FLOW RAPID FLUID EVAPORATION SYSTEM

CROSS-REFERENCE TO RELATED APPLICATIONS

This application is a continuation of U.S. patent application Ser. No. 12/636,527, entitled "Compacted Air Flow Rapid Fluid Evaporation System," filed Dec. 11, 2009, which is incorporated herein by reference in its entirety.

FIELD OF THE INVENTION

The present invention relates to a desalination system comprising a compact mechanical evaporator core integrated with a number of system components and an air input and discharge output. The device is designed to efficiently process salted, turbid, or silted water into desalinated and clean water.

DISCUSSION OF THE RELATED ART

Distillation of water is the oldest used method of desalination. Distillation uses relatively high temperatures (over the boiling point) to turn water into steam and recondenses the steam into water through cooling. The higher the purity of the water needed, the more distillation is required. Distillation operates on the principle of reducing the vapor pressure of the water within the distillation unit to permit boiling to occur at lower temperatures, without the use of additional heat. Distillation units routinely use designs that conserve as much thermal energy as possible by interchanging the heat of condensation and the heat of vaporization within the units. The major energy requirement in the distillation process is providing the heat for vaporization to the feed water. Maintenance costs are high because the distillation apparatus is metal and salt water causes corrosion. Additionally, distillation is inherently thermodynamically inefficient due to energy losses in the process. Therefore the per-unit cost of distilled water is high.

More recently, the primary method of desalinating water is accomplished through a process called reverse osmosis. Reverse osmosis uses a complex combination of membranes, filters, and high-pressure pumps that require pre-filtering. Reverse osmosis is negatively affected by chlorinated water or other chemicals and requires frequent and expensive maintenance. Reverse osmosis also suffers from membrane vulnerabilities that risk rupture or explosion. Typically, reverse osmosis is unable to desalinate turbid water, which exists near many inland waters and large shallow bodies of water. Some experts have stated that significant improvements would require a breakthrough in technology other than reverse osmosis.

Researchers have documented many disadvantages of reverse osmosis, including:
The membranes are sensitive to abuse and deterioration.
The feed water usually needs to be pretreated to remove particulates (in order to prolong the life of the membrane).
There may be interruptions of service during stormy weather (which may increase particulate resuspension and the amount of suspended solids in the feed water) for processing plants that use seawater.
An extensive spare parts inventory must be maintained.
There is a risk of bacterial contamination of the membranes; while bacteria are retained in the brine stream, bacterial growth on the membrane itself can introduce tastes and odors into the water.

The inventor of the present application also invented a Medical Liquid Processor Apparatus and Method described in U.S. patent application Ser. No. 11/337,770. This medical device does not relate to water desalination and is not intended to evaporate a liquid. The device disclosed therein includes a chamber back to an orifice gap that forms the high-speed air flow; a medication feed through the back wall of the chamber in the chamber axis; and a diffuser output nozzle passage. This device creates small particles of liquid medication for passage into the blood stream through the membrane in the lung alveoli.

There continues to be the need for a desalination system that can include a compact evaporator that addresses the deficiencies of the current state of the art. There is also a need for an evaporator that is more efficient, less costly, and a more effective alternative to those currently available.

SUMMARY OF THE INVENTION

The invention disclosed herein offers a desalination system that includes what can be considered a compacted air flow rapid fluid evaporation system. Compared to existing technologies, the present invention is simpler, requires less space, and is more efficient and cost effective to produce and operate.

Salt water enters the system through a large centrifugal separator or a Y strainer and then processes the salt water through an evaporator core that separates the salt and other impurities, forms a water vapor, and the vapor is ultimately reconstituted into desalinated (or lowered salt content) and clean water.

There are no filters used in the evaporator core. The evaporator core also has no moving parts, and only moves air and water throughout.

The evaporator core of the system works by directing dynamic air flow and precisely controlling the rate of the salt-water infusion. The air water mixture moves through multiple chambers within a plurality of processor assemblies of the evaporator core to achieve maximum vaporization efficiency with minimal salt content.

The system operates as a desalination system that includes the devices including a centrifugal separator or Y strainer, a feed water-metering device, a coalescent air filter, an air pump, an evaporator core, and a reconstituting air dryer; all connected with air and feed water tubing to produce desalinated and clean water. The coalescent air filter is not a particulate filter that requires maintenance but one that gathers vapor molecules and reconstitutes them into a liquid state.

The evaporator core of the present invention introduces a physical dynamic by using an expanding passage, such as one formed by conical walls, that increases the surface area of the water using low-level thermal energy to vaporize micron-size water particles into a gaseous state, suitable for reconstitution into clean water. At the same time, the core maintains a liquid brine flow that moves through the core toward its discharge outlet.

The evaporator core is based on creating a highly dynamic environment that is separating impurities from sea, brackish, river or turbid water, and evaporating the water into a residual clean vapor. The coalescent air filter and reconstituting air dryer then returns the water vapor to liquid water.

The evaporator core is more thermo-dynamically efficient, because the core focuses a higher percentage of the energy required to vaporize the water. The energy that vaporizes the water is both kinetic and low-level thermal energy. This energy is in direct contact with the liquid and mostly in the micron-size droplets within the dynamic airflow that minimizes the heat loss to the surrounding structure. These energies are concentrating on the micron-size particles and thereby more efficiently evaporate most of the feed water. Water saturation is maximized under these conditions with the purpose of achieving 100% relative humidity at the output temperature.

The evaporator core is fundamentally different from any type of reverse osmosis or distillation process. The evaporator core requires no pre-filtering. Rather just a centrifugal separator or Y strainer is used for removing large organic and inorganic objects. Also, chlorinated water or other chemicals do not negatively affect the evaporator core; and therefore chorine or other chemicals can be added as needed to prevent system obstructions due to organism growth along the water pipeline. The evaporator core is light, durable, and sustainable. These aspects all make the evaporator core more adaptable for alternative uses which are discussed below.

The evaporator core has multiple chambers and insertion points and is designed such that compressed air and water are infused and interact in a novel way, desalinating and purifying water efficiently. The evaporator core is expected to improve energy efficiency, reduce equipment space requirements and complexity, and minimize operations and maintenance downtime and cost.

There are many capabilities of the system over the existing state-of-the-art are many. The system requires minimal pre-processing that reduces the cost of maintenance. The system requires only a centrifugal separator or Y strainer with no filters thereby also reducing maintenance labor and costs.

Due to significantly lower pounds per square inch pressure requirements, the system has greater thermodynamic energy efficiency. The system also has lower sensitivity to turbid water conditions that achieve improved levels of desalinated water.

There are no exotic expensive materials used, as the evaporator core has been designed for construction with anti-corrosive salt resistant materials, such as 316-grade stainless steel or less expensive polymers. The system is chemically resistant, with no chlorine impact to the device as with reverse osmosis. No toxic chemicals are required, making the system environmentally safe.

Maintenance costs for the system are lower because the system is less complicated, has fewer parts, requires no pre-filtering, and has less downtime. The space requirements or geographical footprint is significantly lower as well as its weight.

The evaporator core is more scalable as the core allows for geometric progression, when compared to current reverse osmosis systems. That is, when the invention disclosed in this application, is geometrically doubled in physical size, the throughput or yield of desalinated water quadruples.

In the embodiment disclosed, pressured and dry air enters the evaporator core via an air pump. A volute entrance passage located in a rear casing brings air flow into the first of a plurality of processor assemblies.

The volute passage sets up a swirling air flow moving into the entrance of processor chamber. Air swirls down a conical passage of decreasing diameter with increasing velocity where the air enters the processing chamber reversing direction at almost 180 degrees where a storm-like activity forms vaporizing the injected liquid. This process is repeated through each of the next seven processor assemblies.

A violent air/water swirling storm-like process forms at the back wall of the processor chamber that turns the water into small droplets thereby increasing the surface area of the water. As this storm-like activity is formed within the mechanical device, the device operates to form a "mechanical storm". This enables highly efficient separation of the salt from the water so as to form a desalinated vapor.

The evaporator core is typically shown and described herein with eight processor assemblies, however more or less numbers of processor assemblies can be used and could be potentially even be used with only one processor assembly.

Alternative embodiments are also possible such as where the processor assembly is modified for high volume air flow at low pressure for lower horsepower requirements. Other modifications include tangential cut passages leading to the nozzle and radial cut passages feeding the chamber gap.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which:

FIG. 5 is an angled view of the evaporator core front casing according to the first embodiment of the present invention.

FIG. 6 is a front view of the evaporator core rear casing according to the first embodiment of the present invention.

FIG. 18 is the perspective front view of the evaporator core according to the present invention.

FIG. 19 is an external perspective view of the evaporator core according to the present invention.

FIG. 20 is a perspective view with the front and rear casings removed according to the present invention.

FIG. 21 is a side view of an evaporator core processor assembly according to an alternative embodiment of the present invention.

FIG. 22 is side cross sectional view of the evaporator core processor assembly according to an alternative embodiment the present invention.

FIG. 23 is a cross sectional view detailing radial cut apertures and tangential cut apertures of the core processor assembly according to an alternative embodiment of the present invention.

FIG. 25 is a cross sectional view detailing the processor assembly and the separator assembly within the core assembly showing the tangential transfer passage from the processor chamber to the separator chamber transfer passage.

DETAILED DESCRIPTION OF THE INVENTION

Illustrative embodiments and aspects are described below. It will of course be appreciated that in the development of any such actual embodiment, numerous implementation-specific decisions must be made to achieve the specific goals of the developer, such as compliance with system-related and business-related constraints that will vary from one implementation to another. Moreover, it will be appreciated that such a development effort might be complex and time-consuming, but would nevertheless be a routine undertaking for those of ordinary skill in the art having the benefit of this disclosure.

Presently preferred embodiments of the invention are described below with reference to the accompanying drawings. Those skilled in the art will understand that the drawings are diagrammatic and schematic representations of presently preferred embodiments, and should not limit the scope of the claimed invention.

Figure 1:
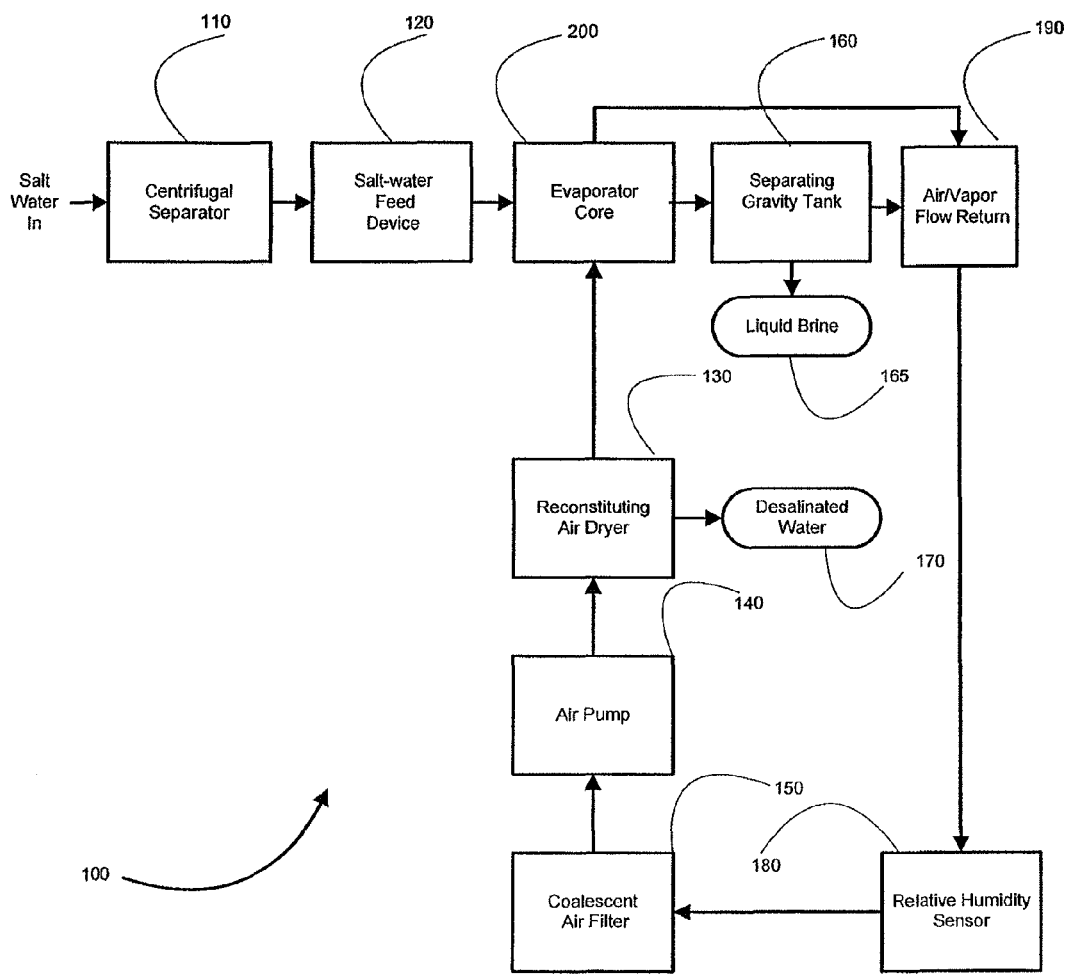
FIG. 1 illustrates a schematic overall view of a system for desalination of water according the first embodiment of the present invention.
Figure 2:
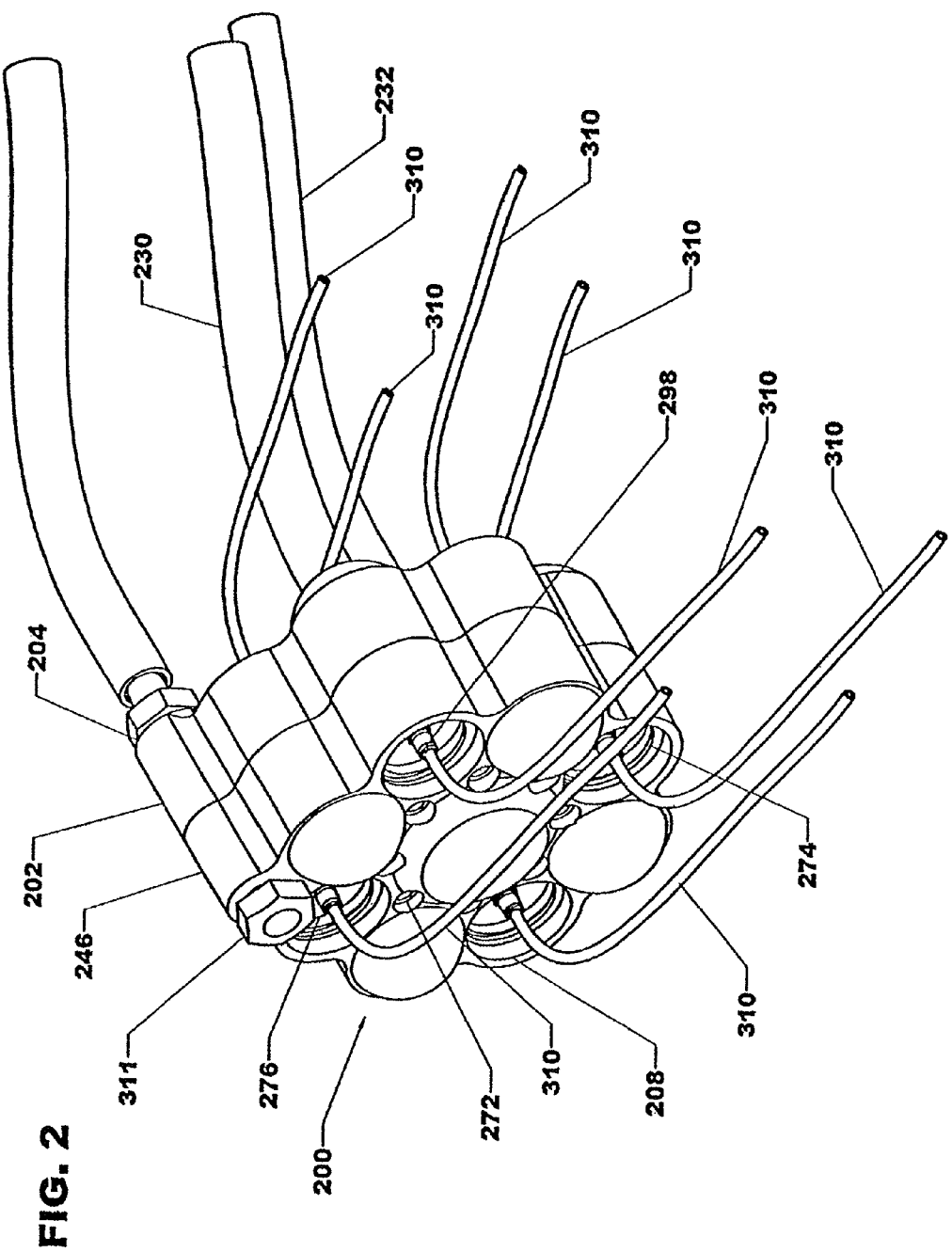
FIG. 2 is a perspective view of the evaporator core assembly according to the first embodiment of the present invention.
Figure 3:
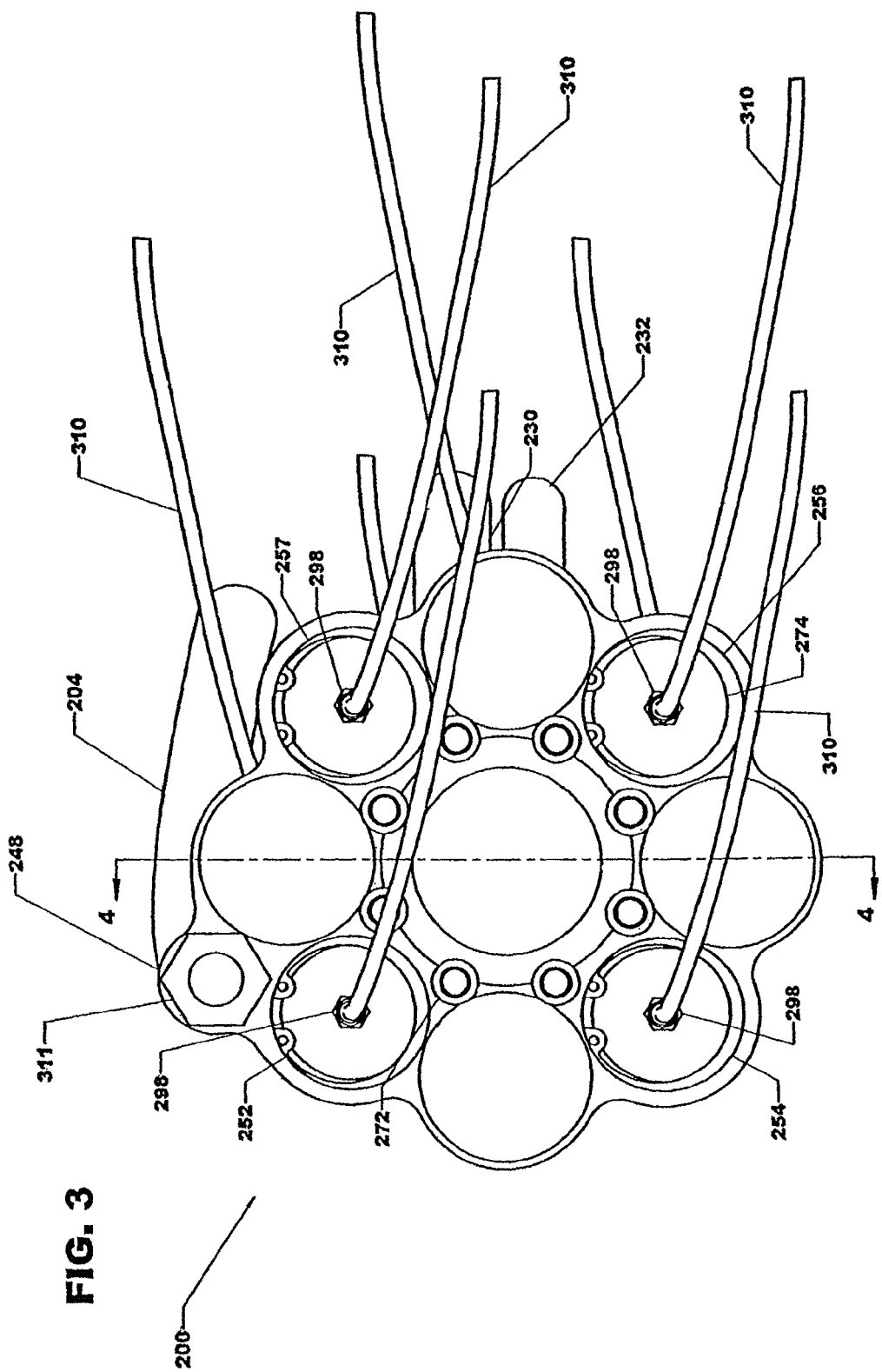
FIG. 3 is a front view of the evaporator core assembly according to the first embodiment of the present invention.
Figure 4:
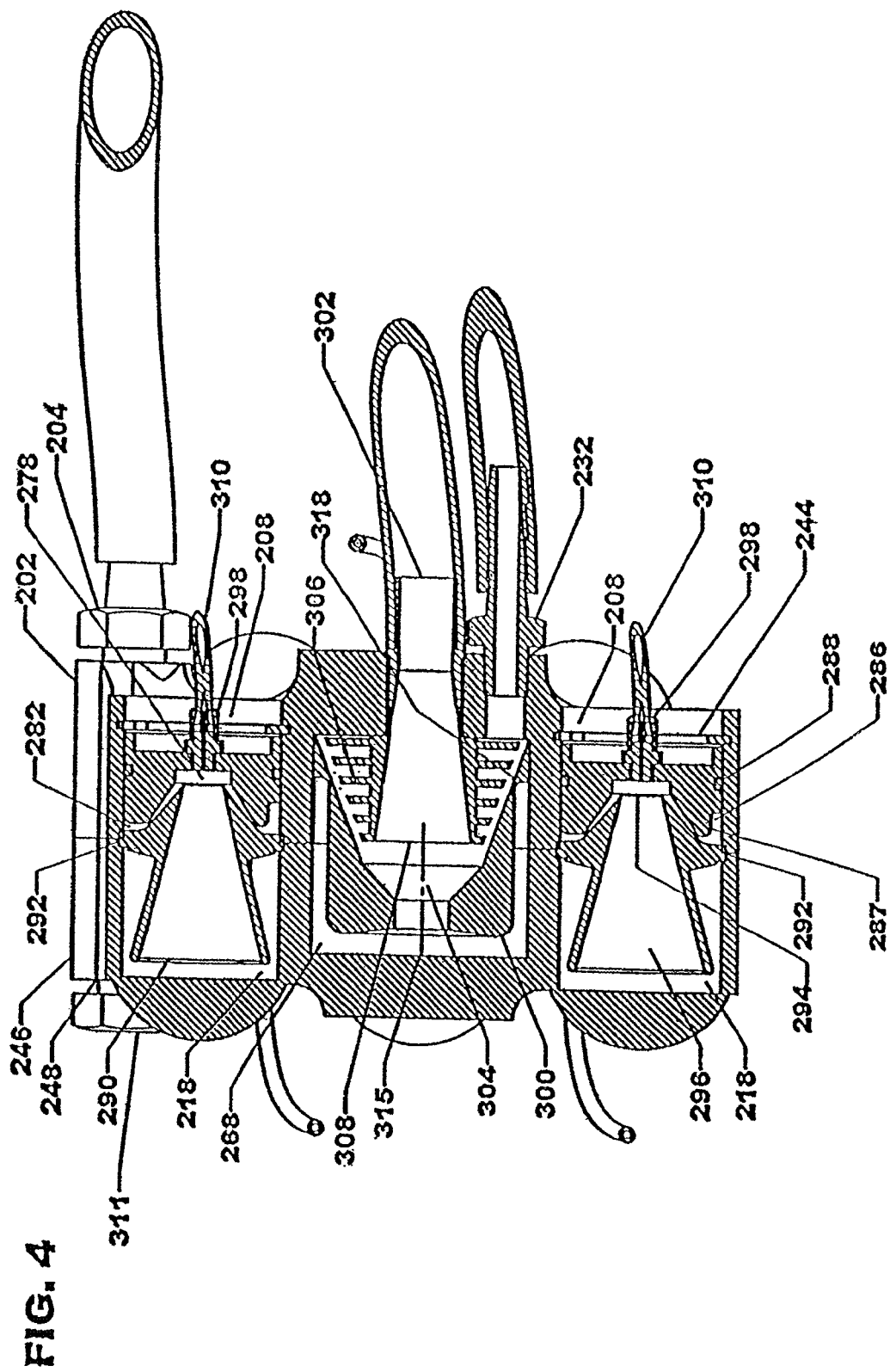
FIG. 4 is a cross sectional view of the evaporator core taken along line 4-4 of FIG. 3 according to the present invention.

According to FIG. 1, there are eight subsystems that make up the entire system. Initially, a centrifugal separator or Y strainer 110 is used to remove large organic and inorganic items such as fish, sticks, moss, roots, bark, and other debris. Following processing of the water in the centrifugal separator or Y strainer 110, the water is fed to a salt water feed device 120. The salt water feed device 120 is provided to inject precise amounts of the salt water at, varying speeds for optimum efficiency. Then a reconstituting air dryer 130 is used to reclaim water into a liquid from a gas for discharge of desalinated water 170.

An air pump 140 functions as the prime mover of the system using compressed air to initiate the dynamic airflows within the evaporator core 200, when mixed with precise amounts of salt water. Also, a coalescent air filter 150 can be used to remove water from the air lines and help take water liquification load off the reconstituting air dryer 130.

An evaporator core 200 is provided after the air filter 150. The evaporator core 200 is preferably made from commercially available grade 316 stainless steel, in this embodiment.

The evaporator core 200 is used to process water, as described herein. After the salt-feed water is completely processed through the evaporator core 200, the brine is separated from the vapor in the separating gravity tank 160, the liquid brine 165 is discharged, and the air/vapor flow 190 is returned to the main flow.

This system also includes a computer-controlled relative humidity sensor 180 that monitors the saturation of the air in a closed-loop computer system to adjust the rate of salt-feed water to maximize efficiency. Adjustment of the feed rate is made until the desired minimum liquidity of brine discharge is achieved. Each of these subsystem components can be connected with commercially available piping to transfer fluid and air within the system.

FIGS. 2-20 disclose the evaporator core 200 including a rear casing 202, a front casing 246, a plurality of scrubber centrifuge chamber to volute transfer passages 236, 267 and multiple processor assemblies 276 arranged in a radial fashion around a central axis, as best illustrated in FIG. 20, for space compactness with a final brine separator centrifuge 300 located in the center.

In this embodiment, the design is based on eight processor assemblies. According to FIGS. 6-7, in the rear casing 202, pressurized air from the output of the external system air pump 140 according to FIG. 1 enters the evaporator core 200 via one of two dry air input apertures 204, 248. Either the rear casing dry air input aperture 204 or the front casing dry air input aperture 248 can be used for air flow. Additionally both dry air input apertures 204, 248 could be used. If only one dry air input aperture is used, the other is plugged with an alternative dry air input aperture plug 311, according to FIGS. 2-8. The rear casing volute entrance passage 206 brings the air flow into the wide-end entrance of the processor chamber volute 286.

The volutes 286 are formed by elements in the processor receptacle 284 and the front and rear casing processor pockets 208, 250. The eccentric cylinder segment 287 portion of the processor receptacle 284 is eccentric to the main body of the processor receptacle 284 in order to form the hollow flow path of the volutes 286 in the cavity between that eccentric cylinder segment 287 and the concentric processor pockets 208, 250 in the rear casing 202 and the front casing 246.

Air entering from the air pump 140 curls around the processor chamber volute 286, flowing inward to the first of eight processor chamber air input gaps 282, in this embodiment. These gaps are formed between the forward surface of the first of eight processor receptacles 284 and the first of eight processor chamber to scrubber chamber bulkheads 292, and preferably form an integral part of the processor nozzle 290. The bulkhead 292 is part of the processor nozzle 290 and held by the rear casing 202 and the front casing 246 so the processor nozzle 290 does not move.

Figure 14:
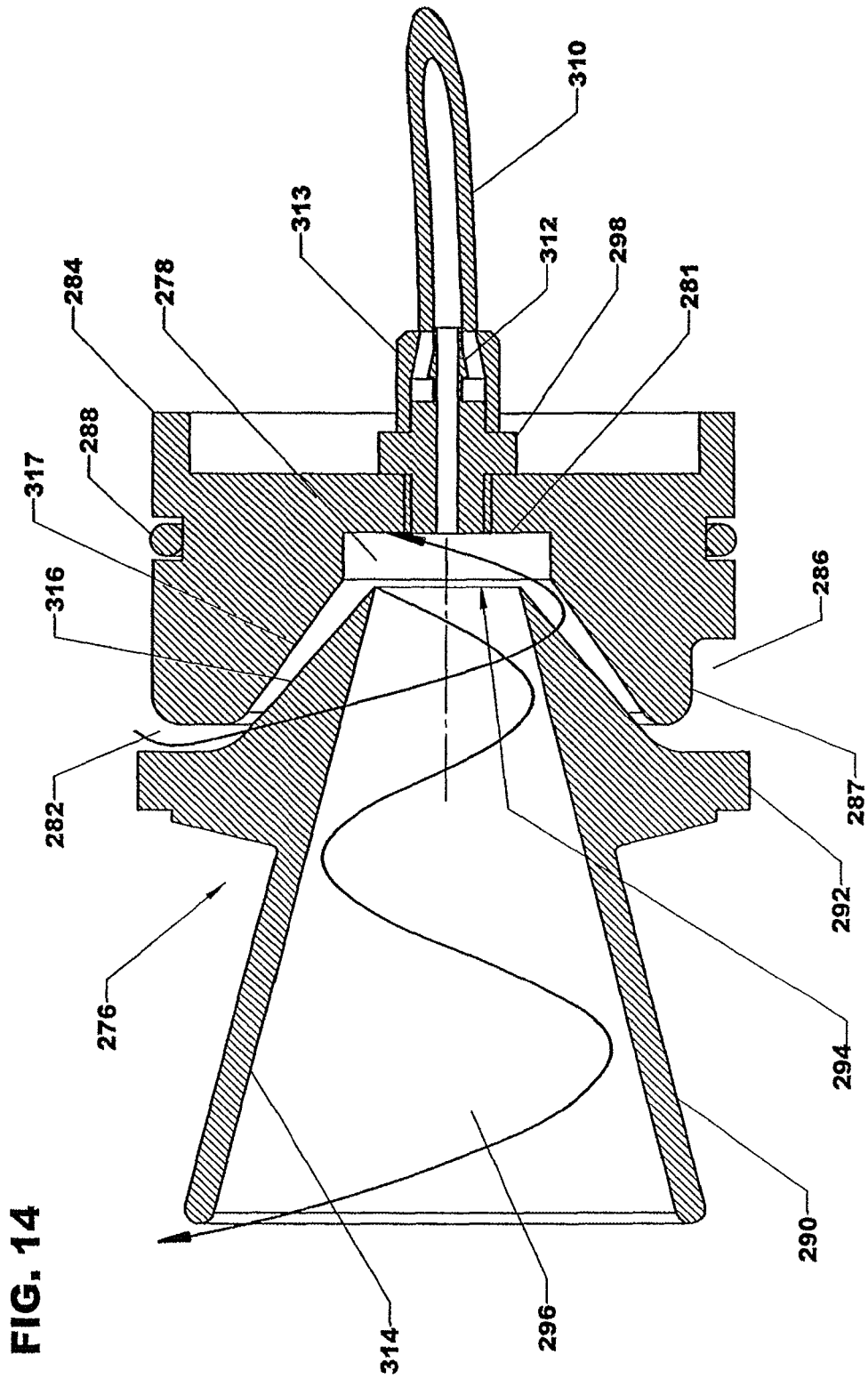
FIG. 14 is a side cross sectional view of the evaporator core processor assembly as shown in FIG. 4 according to the first embodiment of the present invention.
Figure 15:
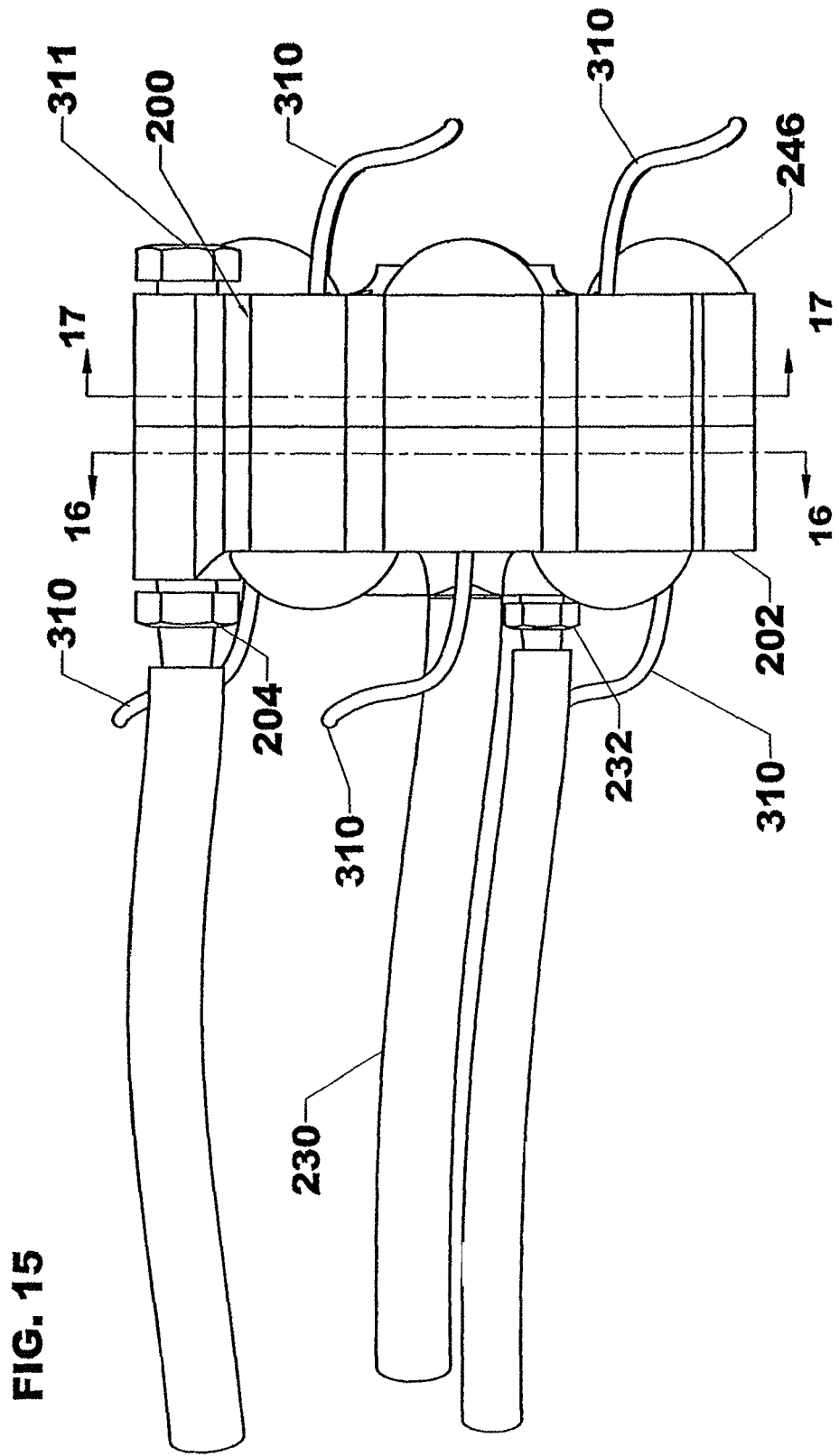
FIG. 15 is a side view of the evaporator core according to the first embodiment of the present invention.

The processor nozzle 290 and the processor receptacles 284 together comprise each of the processor assemblies 276, according to FIG. 14 in this embodiment. The eight processor assemblies 276 are housed in eight processor pockets 208, 250 according to FIGS. 5-8. Four processor pockets 208 are in the rear casing 202 and four processor pockets 250 are in the front casing 246. The rear casing 202 includes the first 210, third 212, fifth 214, and seventh 216 processor pockets. The front casing 246 includes the second 252, fourth 254, sixth 256, and eighth 257. The processor assemblies are positioned in the pockets of each casing 202, 246 with four C-clips 244, 274 each allow easy extraction of the receptacle from the respective pocket. The C-clips hold each processor receptacle 284 in position and keep the processor receptacle 284 from being blown out of the casing when under pressure. Four C-clips 244 are used in the rear casing 244 and four C-clips 274 are used in the front casing 274. O-rings 288 seal the receptacle to prevent the fluid from leaking out. There are eight processor assemblies 276, four in each casing, that are joined together in this embodiment with eight fasteners 240, 270 in a respective bolt circle openings 242, 272 to complete the assembly of the front casing 246 and the rear casing 202. Other methods of securing the structure of the casings such as welding, gluing, flanging, or cementing are also possible.

According to FIG. 1, after the external salt water feed moves through a centrifugal separator or Y strainer 110 to separate large obstructive particles, the feed water reaches the salt water feed device 120. The feed water-metering device then injects one-eighth of the salt-feed water to each of the eight processor assemblies 276 through the coaxial brine input injector 298 along the longitudinal center axis of each processor assembly 276 according to FIG. 14.

The coaxial brine input injector 298 is shown with a hose connection including a hose barb 312, a feed-water hose 310, and a hose-locking device 313. The coaxial brine input injector 298 could also be attached with a flange, with an interference fit, by welding, or by cementing.

A swirling violent storm-like activity, also considered to be a mechanical storm, forms in the area from the first of the eight processor assembly chamber back walls 281 to the respective processor chamber 278. This spacing between the flat chamber back wall surface 281 to nozzle orifice 294 forms a flow path gap and is a primary element that defines the function of the processor and creates the mechanical storm. It is necessary that the gap be calculated for the mechanical storm with a relationship between the orifice 294 to the chamber back wall 281 being preferably mathematically defined according to the following formula:

$$D \pi G_w = (D/2)^2 \pi$$

Wherein:

D=nozzle orifice diameter 294 in English units $G_w$=Gap width in English units

The relationship of the gap between the chamber back wall 281 and the nozzle orifice 294 receiving air from the increasingly descending conical swirling concentrating air flow as seen in FIG. 14, between respective flow path walls 316 and 317, is what creates the mechanical storm that turns the salt-feed water into a fine vapor that tends to remain a vapor.

The salt water feed is transformed into a cloudy vapor in this process. The ambient heat of the compressed air or local waste heat evaporates the majority of the water, dropping out the salt and impurities into a liquid brine discharge coursing along through the system to the brine discharge port, according to FIG. 4. The local waste heat referred to above may be coming from external adjustment industrial heat sources, such as other pumps, engines, renewal energy sources including wind and solar, nuclear power sources, electrical power sources, air systems, energy transformational systems emitting waste heat, chemical to energy mechanical systems, chemical to electrical systems, etc., all readily available in the environment where this invention might be used.

A proper balance of salt water feed rate is needed, obtained by adjusting the salt water feed device 120 for a precise rate of salt water feed influx to create the desired liquid brine discharge. If the salt water feed rate is too low, the salt and minerals dry out and salt cakes form causing the machine to clog. If the salt water feed rate is too high, the efficiency is reduced and the opportunity for desalinating water is wasted. The salt water is helixing along the diffuser wall 314 of the first of eight diffuser discharge passages 296, as the evaporated clean water vapor goes along the center axis of the diffuser discharge passage 296. In other words, the water including the brine spins outwardly against the diffuser wall 314 forming an expanding tube of water. At the same time, the air and water vapor helixes inside the expanding tube of water.

Figure 24:
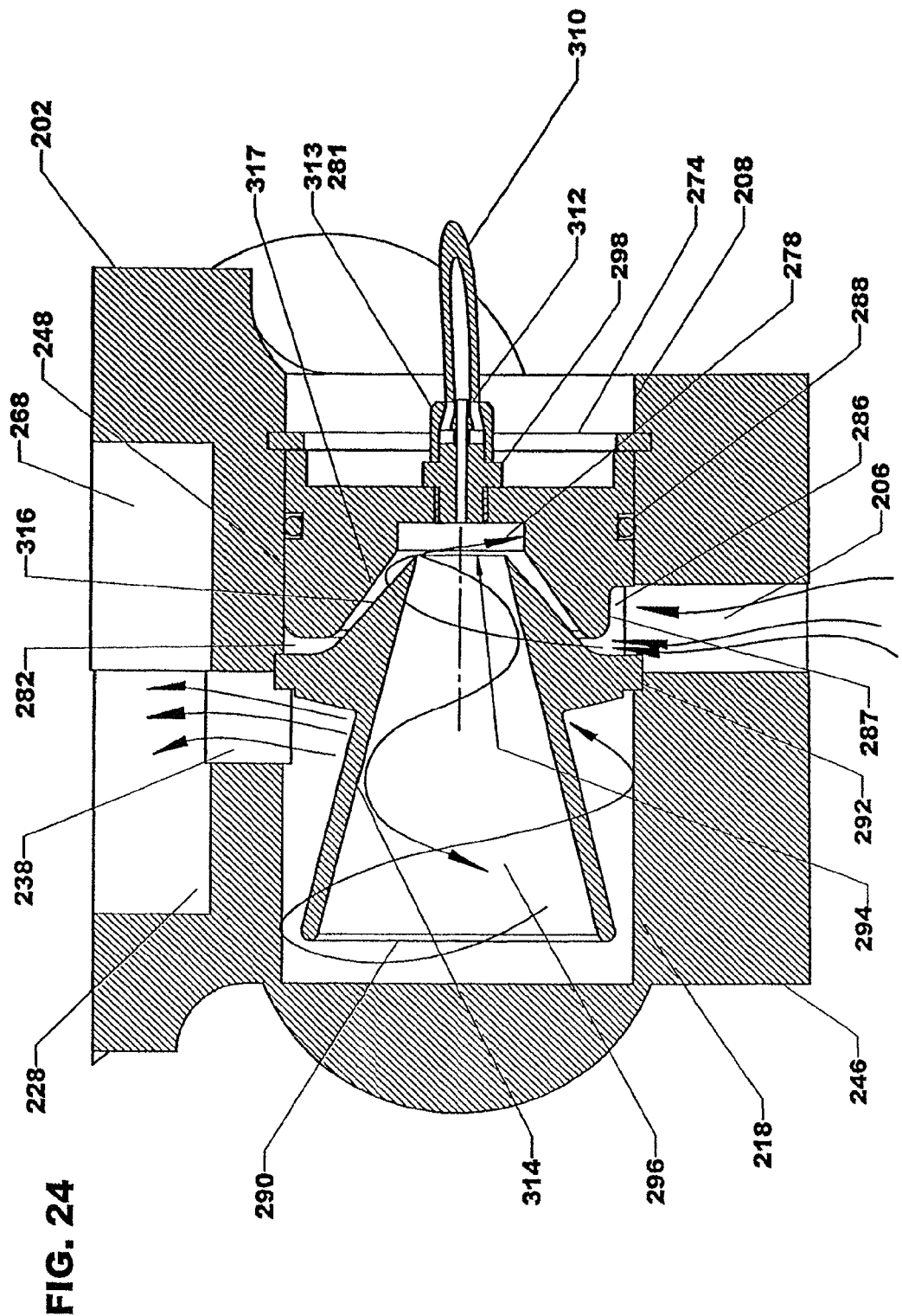
FIG. 24 is a cross sectional view detailing the processor assembly within the core assembly showing the air input and the air output passages to the separator.

As shown in FIG. 24, the water including the brine leaves the diffuser discharge passage 296 along the diffuser wall 314 of the diffuser discharge passage 296, slings off the end of the diffuser wall 314 by centrifugal force into the first cylindrical scrubber centrifuge chamber 260 of eight scrubber centrifuge chambers 258, 218, according to FIGS. 5-8. The water continues to spin along the scrubber chamber wall and then transfers to the next processor air gap 282 via the scrubber centrifuge chamber to volute transfer passage 236, 267 and the processor chamber volute 286.

Figure 7:
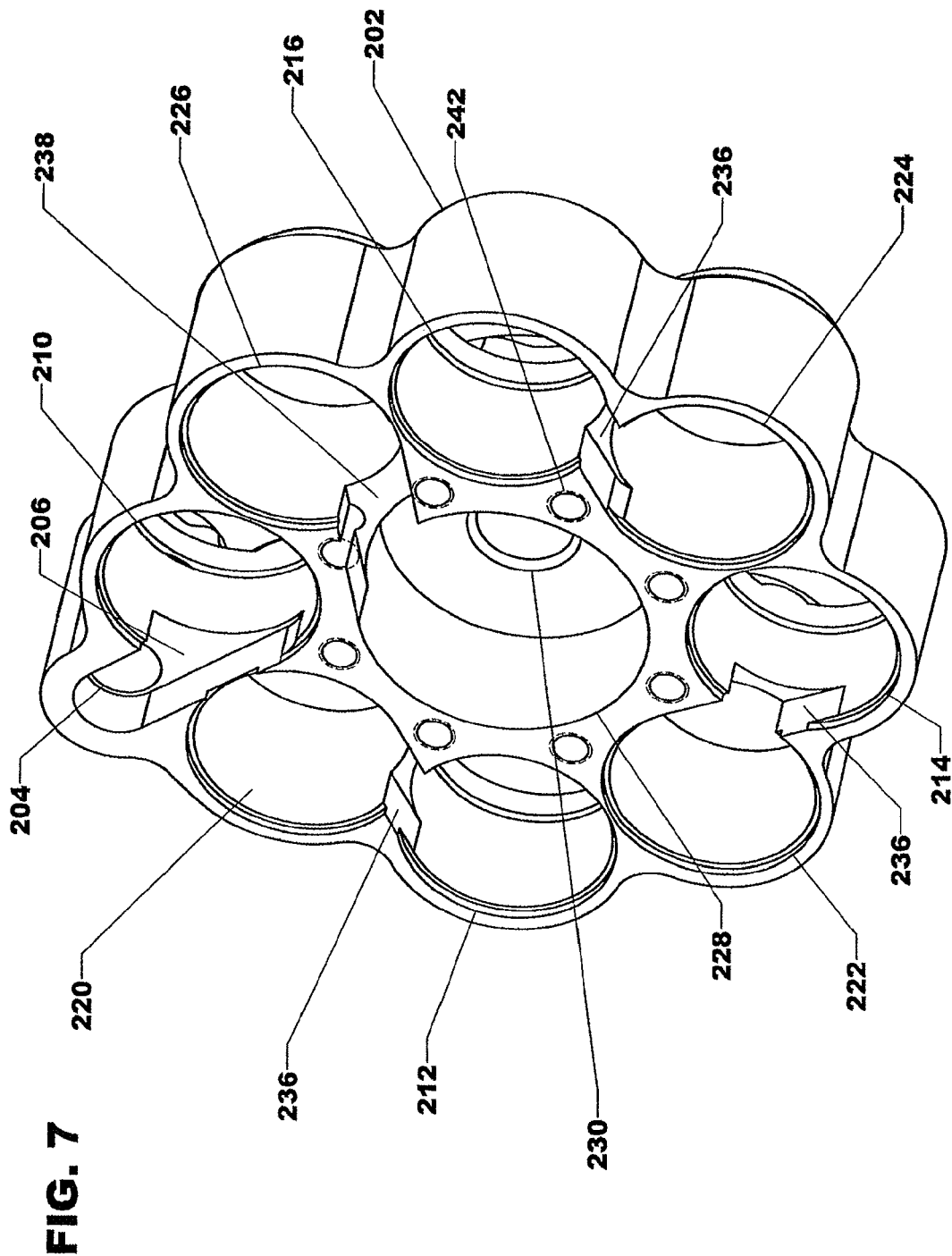
FIG. 7 is a perspective view of the evaporator core rear casing according to the first embodiment of the present invention.
Figure 8:
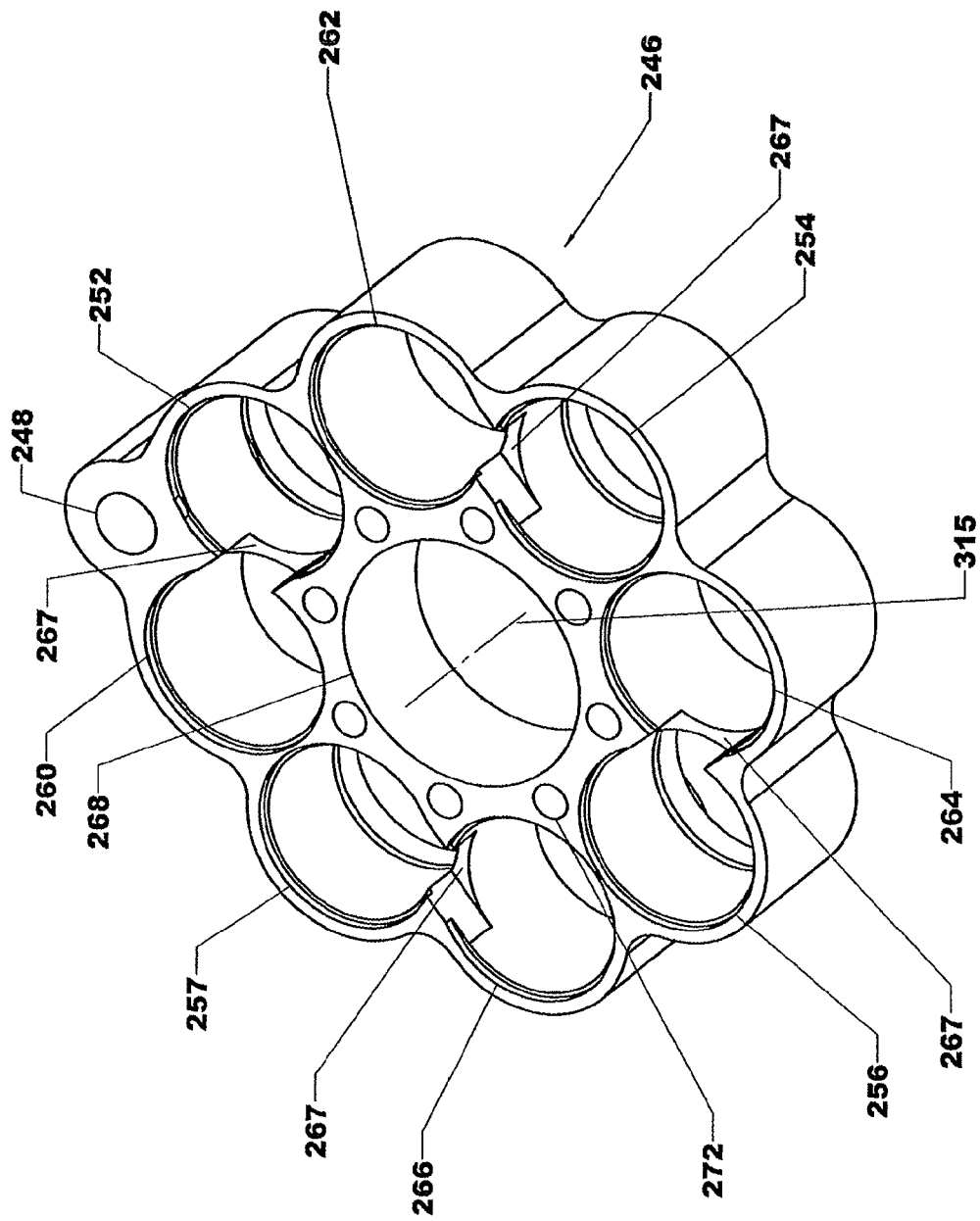
FIG. 8 is a perspective view of the evaporator core front casing according to the first embodiment of the present invention.

According to FIGS. 5 and 8, there are four scrubber centrifuge chambers in the front casing 246 including the first 260, third 262, fifth 264, and the seventh 266 scrubber centrifuge chambers. According to FIGS. 6-7, there are four scrubber centrifuge chambers in the rear casing 202 including the second 220, fourth 222, sixth 224, and eighth 226 scrubber centrifuge chambers.

The interface between the rotating air and rotating water further evaporates and concentrates the brine. Both the brine flow and the air vapor flow exit through the scrubber centrifuge chamber to volute transfer passage 267, in the front casing. The scrubber centrifuge chamber to volute transfer passages 236 in the rear casing and 267 in the front casing are one of two types of tangentially-directed transfer passages 234. These transfer passages 234 and the curved passage of the processor chamber volutes 286 between the processor receptacle 284 including the eccentric cylinder segment 287 and the processor nozzle 290 are designed to keep the air rotation of all of the chambers synchronized and of sufficient area to minimize pressure drops. The other of the two types of transfer passages 234 is the eighth and final scrubber centrifuge chamber to separator transfer passage 238, described later in this disclosure.

The brine flow and air vapor flow then enter the wide-end perimeter of the second processor chamber volute 286. The air enters the second processor chamber air input gap 282 into a helixing air flow at a decreasing conical diameter with increasing helical speed and is defined by the inner flow path wall 316 and the outer flow path wall 317. The space between the flow path wall 316 and the outer flow path wall 317 is a generally conical area.

While it has been shown in this embodiment that the processor receptacle 284 includes a conical facing nozzle, in an alternative embodiment, this conical face could be other shapes such as a curved or convex shaped wall, so long as the area is constant and the area remains the same for the incremental movement down the pathway toward the chamber as this maintains a constant flow rate. In such an alternative embodiment, the outer surface of the nozzle forming the passage would need to be modified to maintain the constant area along the length toward the center.

The air and brine mixture then flows into the second of eight processor chambers 278. As the air flow and air water mixture proceeds toward the center of the receptacle, the flow passage is designed so that the flow is continuous and does not have any back pressure.

In FIG. 14, the space between the chamber back walls 281 and the processor nozzle orifices 294 physically define the processor chambers 278. In the processor chamber, a mechanical storm is formed where one/eighth of the next amount of new salt-feed water is injected.

The combined mixture continues the process with most of the new salt water evaporating along with a small amount of liquid brine discharge, controlled by the salt water feed device 120. This salt water feed device 120 adds enough liquid input at the appropriate controlled rate until a brine discharge is created and processed through the entire system to the brine discharge port 232.

The water vapor brine discharge exits through the processor nozzle orifice 294 and proceeds through the conical diffuser discharge passage 296. The water vapor and the brine discharge then enter the second scrubber centrifuge chamber 220 and exit via the scrubber centrifuge chamber to volute transfer passage 236 to the third processor chamber volute 286. The entire process continues six more times in this embodiment going through the third, fourth, fifth, sixth, seventh, and eighth processor stages.

Figure 10:
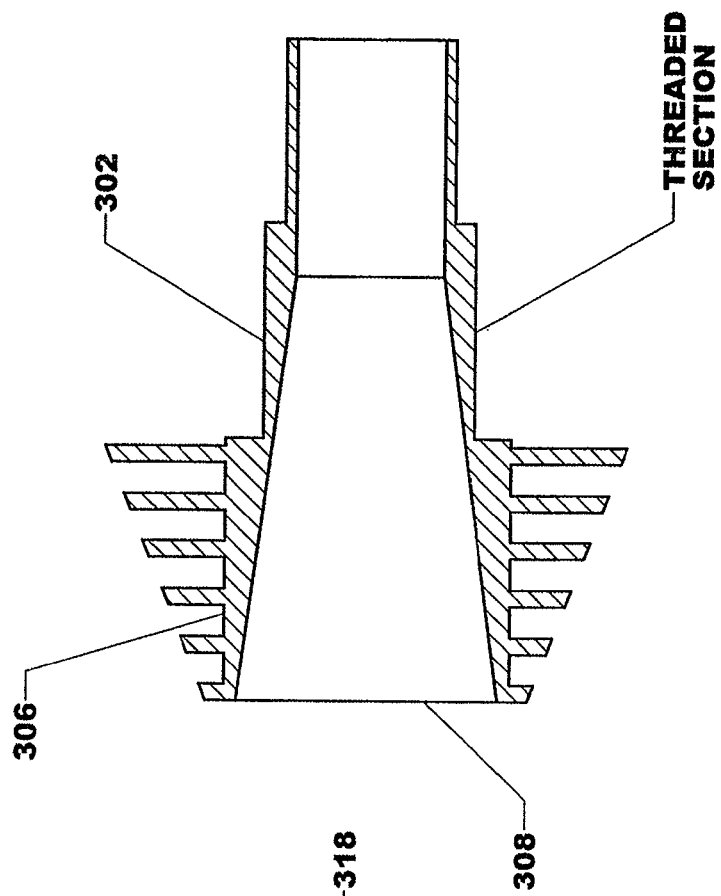
FIG. 10 is a cross sectional detailed view of the evaporator core separator output nozzle shown in FIG. 4 according to the first embodiment of the present invention.
Figure 9:
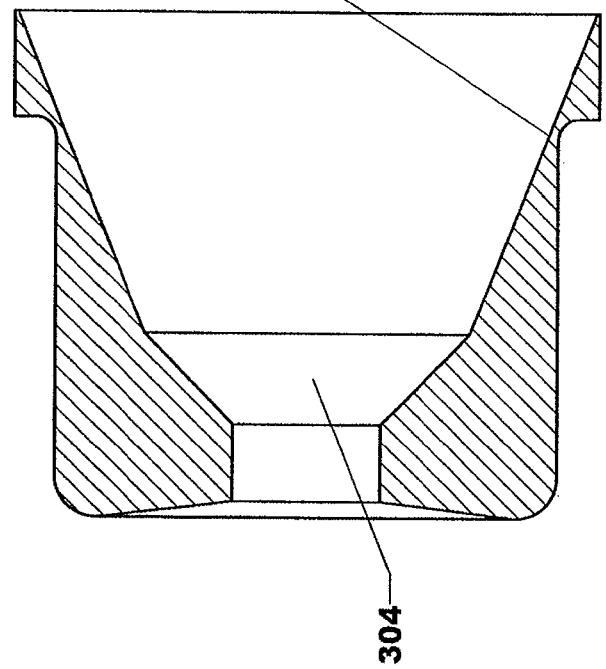
FIG. 9 is a cross sectional detailed view of the evaporator core separator centrifuge shown in FIG. 4 according to the first embodiment of the present invention.
Figure 11:
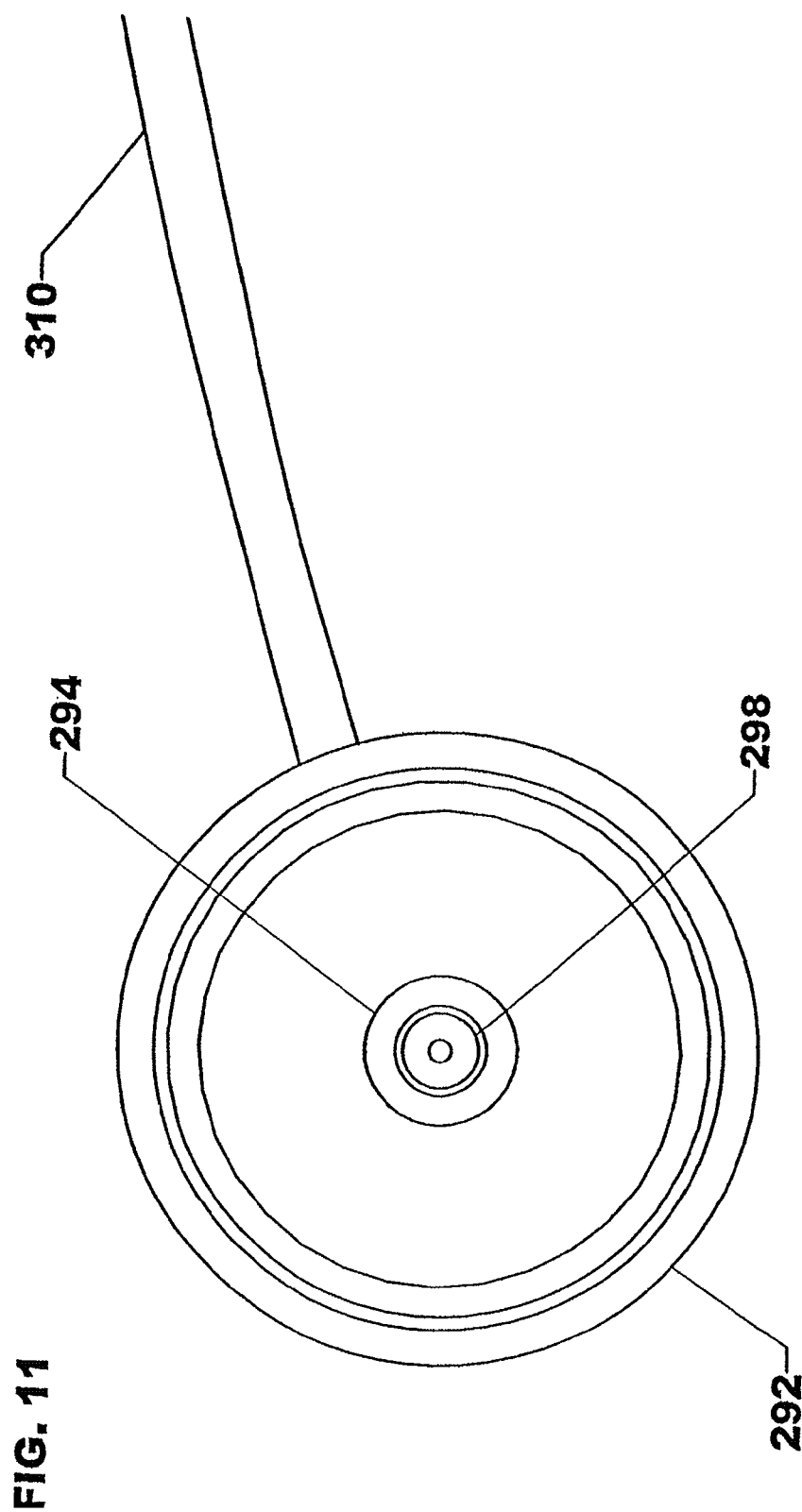
FIG. 11 is a left side view of the evaporator core processor assembly according to the first embodiment of the present invention.
Figure 12:
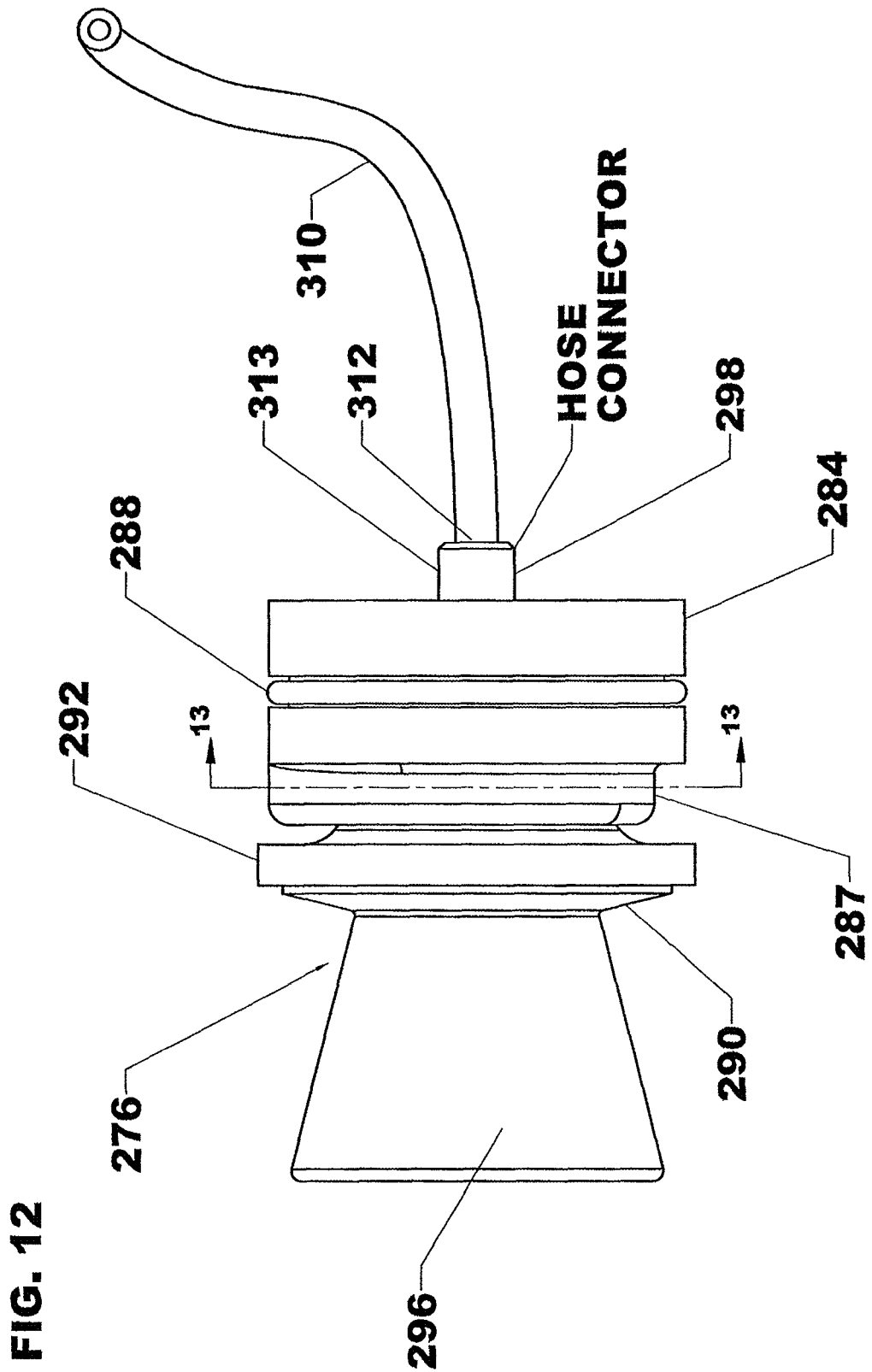
FIG. 12 is an external side view of the evaporator core processor assembly according to the first embodiment of the present invention.
Figure 13:
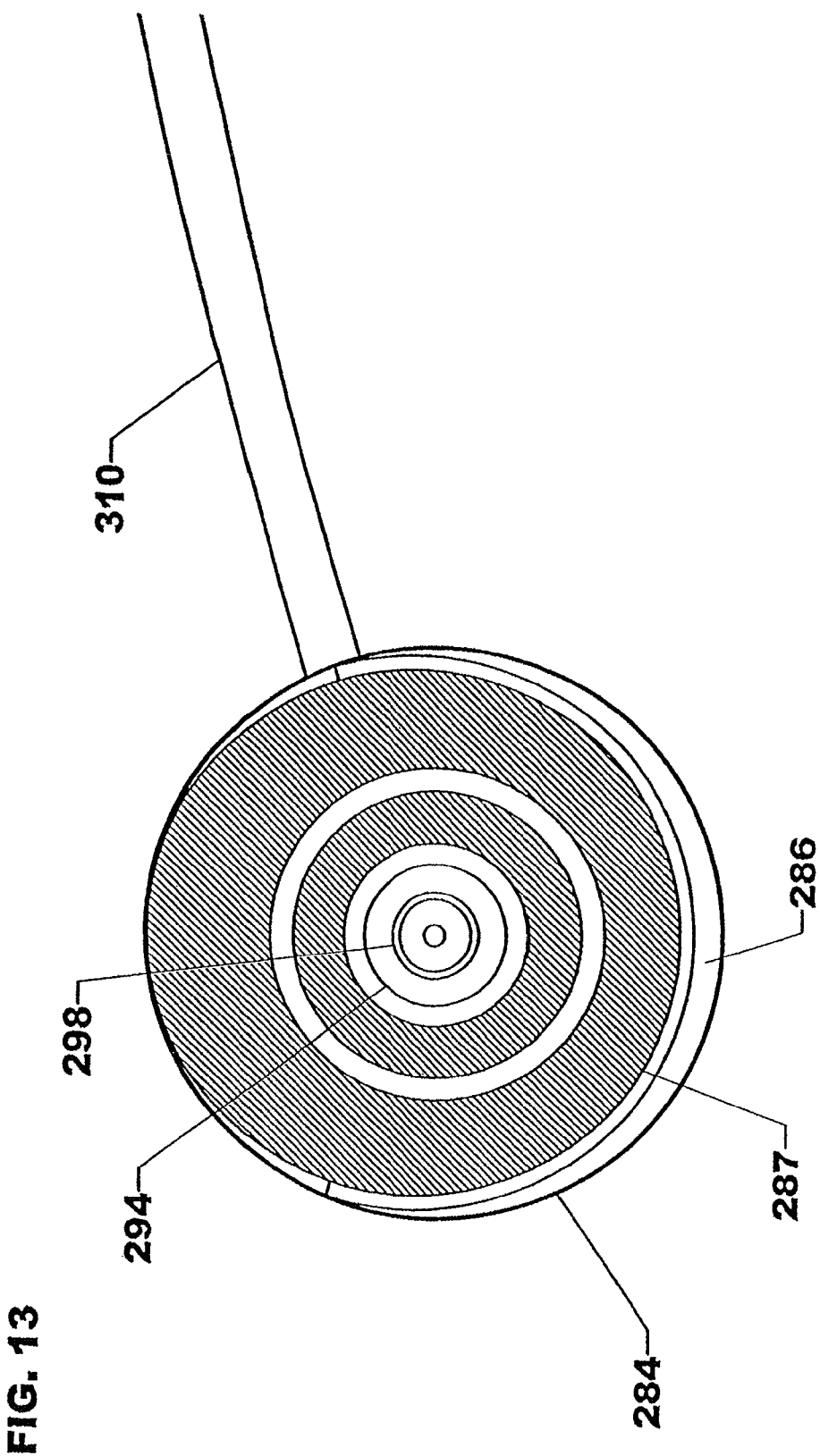
FIG. 13 is a cross sectional view of the evaporator core processor assembly volute detail taken along line 13-13 of FIG. 12 according to the first embodiment of the present invention.
Figure 16:
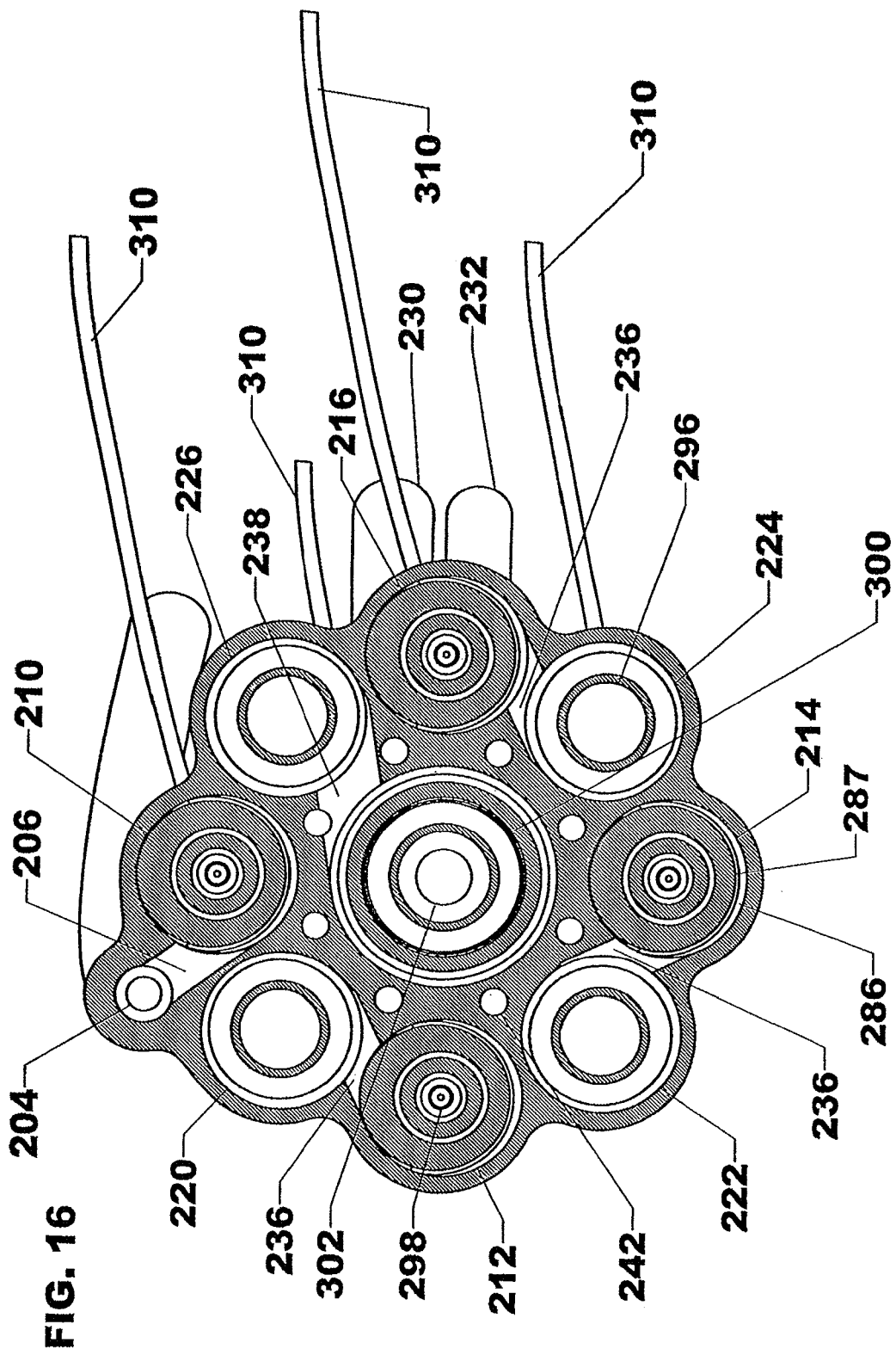
FIG. 16 is a cross sectional view of the evaporator core rear casing taken along line 16-16 in FIG. 15 according to the present invention.
Figure 17:
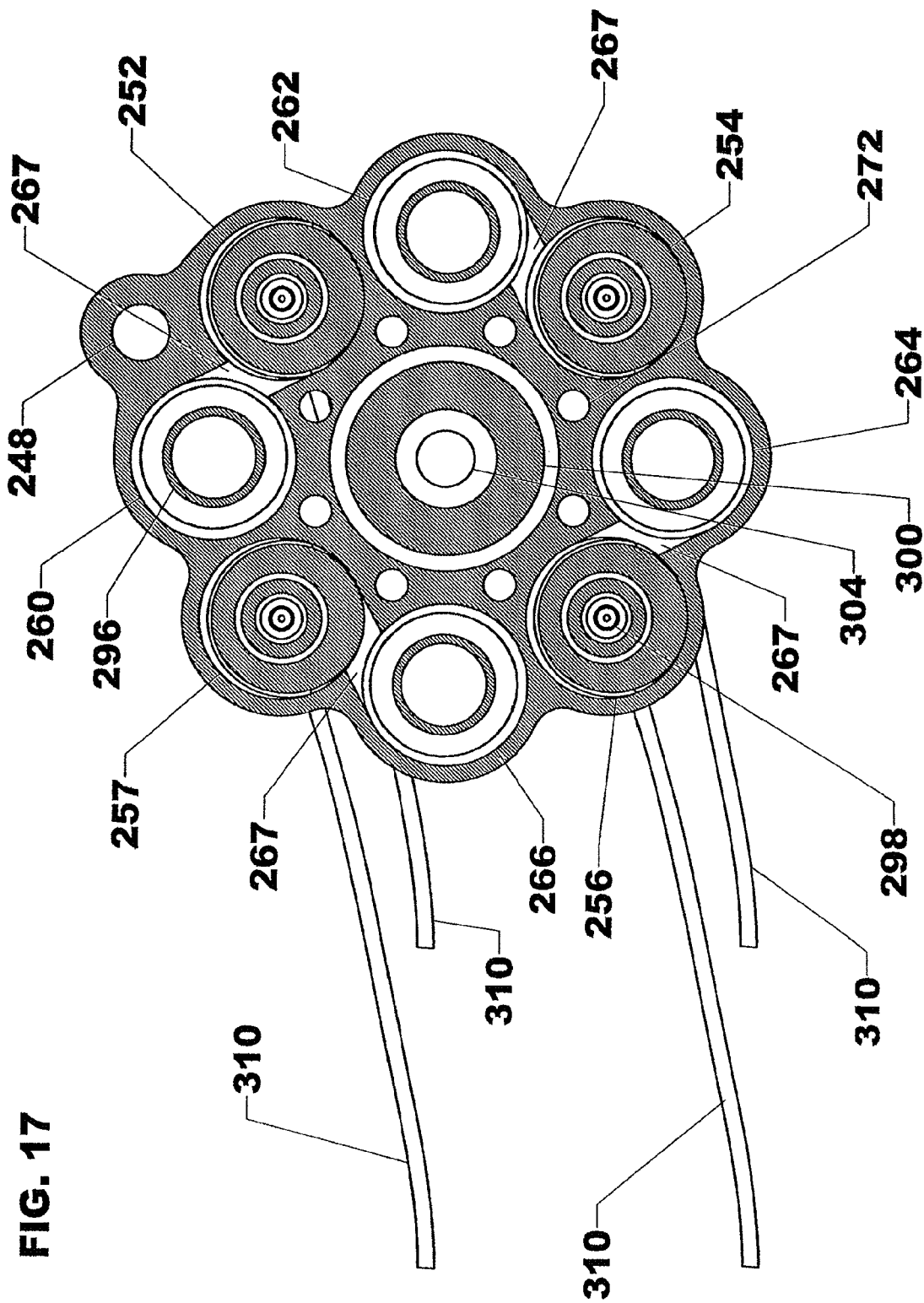
FIG. 17 is a cross sectional view of the evaporator core front casing taken along the line 17-17 in FIG. 15 according to the present invention.

After the flow completes processing through the eighth scrubber centrifuge chamber 226, the liquid brine flows from the final scrubber centrifuge chamber to the separator transfer passage 238, according to FIGS. 6, 7, and 16. As shown in FIGS. 9-10, the flow enters the center separator assembly chamber 228, 268 and the air vapor brine flow helixes towards the front casing 246 end of the center separator assembly chamber 228 and centralizes around the longitudinal center axis of the front wall 315.

The flow transfers into the separator centrifuge 300 via the gap between the front wall 315 of the center separator assembly chamber 228, 268 and the entrance of the liquid and air vapor-separating chamber 304. The final brine waste passes along the wall of the liquid and air vapor-separating chamber 304 where the final brine waste helixes toward the rear casing brine discharge port 232.

The air carrying the desalinated water vapor exits via the separator output nozzle 302 that is threaded into the vapor output port 230. The mouth of the nozzle 308 is designed with a large diameter opening to reduce the air velocity and prevent the ingestion of brine. Furthermore, centrifuge fins 306 are designed to collect brine into large slow rotating volumes to be slung back into the brine discharge path 318. The brine discharge, motivated by a small vapor flow, prepares for disposal through a separating gravity tank 160. The liquid brine 165 is then prepared for disposal and the air/vapor flow return 190 then passes on to the main air water vapor flow.

The air water vapor flows around through to the reconstituting air dryer 130 where the water vapor is reconstituted into clean and desalinated water 170. The dried air from the reconstituting air dryer 130 is recycled through the system maximize efficient energy reuse. The brine flow rate is computer controlled using a relative humidity sensor 180, or other applicable sensors, including liquid sensors, light sensors that measure liquid, etc. In a closed-loop computer controlled system, the relative humidity sensor 180 directs the water flow rate for the salt water feed device 120.

FIGS. 21-23 disclose an alternative embodiment to the evaporator core processor assemblies 276. All references to the present invention are directly related to the alternative embodiment references which begin with reference numeral beginning with the 500 series. For example, the processor nozzle 290 and the processor nozzle 590 is used for the alternative embodiment. In the disclosed alternative embodiment the nozzle orifices are shown as 594, the diffuser discharge passages are shown as 596, the chamber back wall is shown as 581, and the processor receptacle are shown as 584.

In this alternative embodiment, there are two new features. The first feature includes radial cut input passages 514 replacing the processor chamber volutes 286 in the present invention. The second feature includes tangentially cut input passages 515 in the nozzle and they create the swirling air flow in the processor chamber 578 similar to the processor chamber volute 286 in the earlier embodiment. This alternative embodiment is designed for high air flow and low pressure to conserve energy through reduced horsepower requirements.

Other alternative embodiments are envisioned including those adapted for manufacturing processes to improve feed water for liquid distilling and food preparation. Another alternative embodiment of the present invention can be used for removing (or dewatering) excess liquid from manufacturing processes, such as paper pulp water extraction, fruit pulp dewatering and drying, or crude oil dewatering. In these industrial applications, where excess water is unneeded, the water vapor can be discharged into the atmosphere.

In the first embodiment, the design is based on eight processor assemblies, but other numbers of processor assemblies can be used and are contemplated by this invention. Specifically, this device could operate with only a single processor assembly.

The other subsystems of the present invention may be acquired commercially, including, for example, the air dryer, the air pump, the sensors, and the computer to control the feed-water rate.

While it has been shown in this embodiment that the receptacle includes a conical facing nozzle, in an alternative embodiment, this conical face could be other shapes such as a curved wall or a convex wall, so long as the passageway area is the same area along the length of the passageway. In such an alternative embodiment, the outer surface of the nozzle forming the passage would also probably need to be modified to maintain the constant area along the length toward the center.

The coaxial brine input injector 298 in this disclosure is shown with a hose connection including a hose barb 312, a feed-water hose 310 and hose-locking device 313. The coaxial brine input injector 298 could also be attached with other means such as a flange, an interference fit, by welding, or by cementing.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A method, comprising:
    conveying a solution containing a solvent and a solute from a solution source to a mixing chamber via a first flow path defined by a processor assembly;
    conveying a gas from a gas source to the mixing chamber via a second flow path defined by the processor assembly, the processor assembly configured such that first flow path is distinct from the second flow path;
    mixing the solution and the gas in the mixing chamber to produce an atomized mixture of the solution and the gas;
    conveying the mixture of the gas and the solution to a separator chamber via a third flow path, the third flow path defined by an outlet nozzle; and
    separating within the separator chamber the atomized mixture to produce a first outlet flow containing a vaporized portion of the solvent and a second outlet flow containing a liquid portion of the solvent and the solute.

2. The method of claim 1, wherein the first flow path is defined by an inner surface of an inlet member of the processor assembly and the second flow path is defined by an outer surface of the inlet member and an inner surface of the outlet nozzle of the processor assembly.

3. The method of claim 1, wherein the first flow path is defined by an inner surface of an inlet member of the processor assembly and the second flow path is defined by an outer surface of the inlet member and an inner surface of the outlet nozzle of the processor assembly, the outer surface of the inlet member including a flow structure configured to produce a rotational velocity component within a flow of the gas when the gas exits the second flow path.

4. The method of claim 1, wherein the solvent is water and the solute includes salt.

5. The method of claim 1, wherein:
the third flow path is defined by an inner surface of the outlet nozzle, the inner surface of the outlet nozzle being tapered.

6. A method, comprising:
conveying a gas from a gas source to a mixing chamber of a processor assembly via a gas flow path defined at least in part by an outer surface of an inlet member of the processor assembly;
conveying a solution containing a solvent and a solute from a solution source to the mixing chamber via a solution flow path defined by an inner surface of the inlet member of the processor assembly, the conveying the solution via the solution flow path performed prior to the solution being mixed with the gas;
mixing the solution and the gas in the mixing chamber to produce at least a partially atomized mixture of the solution and the gas;

separating the atomized mixture to produce a first outlet flow containing a vaporized portion of the solvent and a second outlet flow containing a liquid portion of the solvent and the solute; and conveying the mixture of the gas and the solution to a separator chamber via a third flow path, the third flow path defined by an inner surface of an outlet nozzle of the processor assembly, the inner surface of the outlet nozzle being tapered, the separating performed within the separator chamber.

7. The method of claim 6, wherein the gas flow path is defined by the outer surface of the inlet member and the inner surface of the outlet nozzle of the processor assembly.

8. The method of claim 7, wherein the outer surface of the inlet member includes a flow structure configured to produce a rotational velocity component within a flow of the gas when the gas exits the gas flow path.

9. The method of claim 6, wherein the inlet member includes a flow structure having a helical-shaped surface, the flow structure configured to produce a rotational velocity component within a flow of the gas when the gas enters the mixing chamber.

10. The method of claim 6, wherein:

the conveying the gas includes producing a rotational velocity component within a flow of the gas when the gas exits the gas flow path; and the conveying the solution includes conveying the solution in a substantially linear direction within the inlet member of a processor assembly.

11. The method of claim 6, wherein the solvent is water and the solute includes salt.

12. A method, comprising:

conveying a gas from a gas source to a mixing chamber of a processor assembly via a gas flow path, the gas flow path defined by an outer surface of an inlet member of the processor assembly and an outlet nozzle of the processor assembly, the mixing chamber defined by the inlet member and the outlet nozzle;

conveying a solution containing a solvent and a solute from a solution source to the mixing chamber via a solution flow path defined by an inner surface of the inlet member of the processor assembly, the conveying the solution via the solution flow path performed separately from the conveying the gas;

mixing the solution and the gas in the mixing chamber to produce at least a partially atomized mixture of the solution and the gas; and conveying the atomized mixture of the gas and the solution from the mixing chamber toward a separator via a discharge passage defined by the outlet nozzle, discharge passage diverging along a longitudinal axis of the outlet nozzle, the separator configured to separate the atomized mixture to produce an outlet flow containing a vaporized portion of the solvent.

13. The method of claim 12, wherein:

the outlet flow is a first outlet flow; and the separator is further configured to produce a second outlet flow including a liquid portion of the solvent from the solution and a solute from the solution.

14. The method of claim 12, wherein the outer surface of the inlet member includes a flow structure configured to produce a rotational velocity component within a flow of the gas when the gas exits the gas flow path.

15. The method of claim 12, wherein the inlet member includes a flow structure having a helical-shaped surface, the flow structure configured to produce a rotational velocity component within a flow of the gas when the gas enters the mixing chamber.

16. The method of claim 12, wherein:

the conveying the gas includes producing a rotational velocity component within a flow of the gas when the gas exits the gas flow path; and the conveying the solution includes conveying the solution in a substantially linear direction within the inlet member of a processor assembly.

17. The method of claim 12, wherein the solvent is water and the solute includes salt.

* * * * *